US012245030B2

(12) United States Patent
Vanoss et al.

(10) Patent No.: US 12,245,030 B2
(45) Date of Patent: Mar. 4, 2025

(54) BLOCKCHAIN SECURED POLYPHONIC RADIO (PR) WIRELESS MESH NETWORKS USING PULSE-BASED COMMUNICATIONS (PBC) METHODS AND APPARATUS

(71) Applicants: Lawrence Livermore National Security, LLC, Livermore, CA (US); Avian, Inc., Lexington Park, MD (US)

(72) Inventors: Vincent M. Vanoss, Leonardtown, MD (US); Faranak Nekoogar, San Ramon, CA (US); Farid U. Dowla, Castro Valley, CA (US)

(73) Assignee: AVIAN, INC., Lexington Park, MD (US)

( * ) Notice: Subject to any disclaimer, the term of this patent is extended or adjusted under 35 U.S.C. 154(b) by 748 days.

(21) Appl. No.: 17/244,763

(22) Filed: Apr. 29, 2021

(65) Prior Publication Data

US 2022/0286845 A1    Sep. 8, 2022

Related U.S. Application Data

(60) Provisional application No. 63/157,342, filed on Mar. 5, 2021.

(51) Int. Cl.
*H04W 12/08*    (2021.01)
*H04L 9/32*    (2006.01)
*H04W 12/06*    (2021.01)
*H04L 9/00*    (2022.01)

(52) U.S. Cl.
CPC .......... *H04W 12/06* (2013.01); *H04L 9/3236* (2013.01); *H04L 9/3271* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 7,194,019 B2 | 3/2007 | Dowla et al. | |
| 8,102,955 B2 | 1/2012 | Nekoogar et al. | |
| 8,451,164 B2 | 5/2013 | Dowla et al. | |
| 9,537,604 B2 | 1/2017 | Dowla et al. | |
| 10,811,771 B1 * | 10/2020 | Tran | G06N 3/04 |
| 2004/0202230 A1 | 10/2004 | Dowla et al. | |
| 2005/0286610 A1 | 12/2005 | Dowla et al. | |
| 2009/0074119 A1 | 3/2009 | Nekoogar et al. | |
| 2016/0043963 A1 | 2/2016 | Oran | |

(Continued)

OTHER PUBLICATIONS

Kim, Harry, International Search Report and Written Opinion received from the USRO dated May 11, 2022 for appln. No. PCT/US2022/017091, 13 pgs.

(Continued)

*Primary Examiner* — Willie J Daniel, Jr.
(74) *Attorney, Agent, or Firm* — Jaquez Land Greenhaus & McFarland LLP; Bruce W. Greenhaus

(57) ABSTRACT

A networking architecture that incorporates the security of Blockchain distributed ledgers as an authentication layer, while connecting mesh nodes using secure, pulse-based wide-band and ultra wide-band communication technology to provide a nearly undetectable, unbreakable, and dynamic wireless communication mesh architecture that can securely transmit data, voice and video over short ranges, in one embodiment, up to 1 Km, is disclosed.

3 Claims, 7 Drawing Sheets

(56) References Cited

U.S. PATENT DOCUMENTS

2020/0389206 A1  12/2020  Dowla et al.
2021/0250812 A1* 8/2021  Caswell .................. H04L 45/44

OTHER PUBLICATIONS

Selimi, et al., "Towards Blockchain-enabled Wireless Mesh Networks", Proceedings of the 1st Workshop on Cryptocurrencies and Blockchains for Disbributed Systems, 2018, Apr. 2, 2018.
Doherty, Fiona, International Preliminary Report on Patentability received from WIPO dated Sep. 14, 2023 for appln. No. PCT/US2022/017091, 6 pgs.

* cited by examiner

BLOCKCHAIN SECURED POLYPHONIC RADIO (PR) WIRELESS MESH NETWORKS USING PULSE-BASED COMMUNICATIONS (PBC) METHODS AND APPARATUS

CLAIM OF PRIORITY TO PREVIOUSLY FILED PROVISIONAL APPLICATION—INCORPORATION BY REFERENCE

The application claims priority under 35 USC section 111 (b) and under 35 USC section 119 (e), to earlier-filed provisional application No. 63/157,342, filed Mar. 5, 2021, entitled "Blockchain Secured Polyphonic Radio (PR) Wireless Mesh Networks using Pulse-Based Communications (PBC) Methods and Apparatus"; and the contents of this earlier-filed provisional application (App. No. 63/157,342) are hereby incorporated by reference herein as if set forth in full.

STATEMENT AS TO RIGHTS TO INVENTIONS MADE UNDER FEDERALLY SPONSORED RESEARCH AND DEVELOPMENT

The United States Government has rights in this invention as this invention was made with government support pursuant to Contract No. DE-AC52-07NA27344 between the United States Department of Energy and Lawrence Livermore National Security, LLC for the operation of Lawrence Livermore National Laboratory. The government has certain rights in the invention.

BACKGROUND

(1) Technical Field

The presently disclosed methods and apparatus is related to secured wireless networks and wireless network architectures, and more specifically to secured wireless mesh network architectures using pulse-based communications (PBC), wide-band, or ultra-wide-band (WB/UWB) communication technologies, Blockchain Authentication, encryption and authorization, and Named Data Networks (NDN) to receive and transmit data and other information on the network.

(2) Background

Wireless networks are ubiquitous in modern society and well-known in the prior art. Exemplary prior art wireless networks include, but not limited to, Code Division Multiple Access (CDMA), Time Division Multiple Access (TDMA), Bluetooth, Wi-Fi networks, and the like. Each of these wireless networks have advantages and disadvantages depending upon how the networks are used in a particular application or instantiation.

Other wireless networks include Low Power Wide Area Networks (or LPN), which is a type of wireless telecommunications wide area network designed to facilitate long-range communications at a low bit rate among connected objects or apparatus, such as battery powered sensors. As is well known, Low Power Wide Area Networks (LPWANs) comprise wireless technologies having characteristics such as large coverage areas, low bandwidth, possibly very small packet and application-layer data sizes, and long battery life operation. Most technologies in this space aim for a similar goal of supporting large numbers of very low-cost, low-data-throughput devices with very low power consumption, so that even battery-powered devices can be deployed for years. LPWAN devices also tend to be constrained in their use of bandwidth, for example, with limited frequencies being allowed to be used within limited duty cycles (usually expressed as a percentage of time per hour that a device is allowed to transmit). As the name implies, one common goal of LPWA networks is coverage of large areas. LPWANs are often used to create private wireless sensor networks. Typical implementations of LPWANs have relatively low data rates ranging from 0.3 kbit/s to 50 kbit/s per channel.

Devices such as computers, tablets, cell phones, and radios are common "clients" in wireless networks. A wireless client in some ways may by analogized to a person in an audience watching a play or a movie. The theoretical person is one of several or many people accessing information via the same conduit—the wireless network. Most wireless networks use Access Points—devices that host and control the wireless connection for laptops, tablets, or smart phones. If a Wi-Fi network is used in a home or office environment, it most likely uses an Access Point.

Some wireless devices (laptops, smart phones, wireless routers, radios) support a mode called Ad-Hoc. This allows those devices to connect together directly, without an Access Point in-between controlling the connection. This forms a different type of network—in Ad-Hoc mode, all devices are responsible for sending and receiving messages to the other devices—without anything else acting as an in-between interface. In an Ad-Hoc network, every device must be in this role, and using the same configuration to participate. Not all devices use this mode, and some have it as a "hidden" feature.

Ad-Hoc devices are used to create a "Mesh" network, so when they are in this mode, they are called "Mesh Nodes". Ad-Hoc, or Mesh nodes, are analogous to an individual in a group or roundtable discussion. They can take equal part in the conversation, raising their hand when they want to speak so the others will listen. If someone at the end of the table cannot hear, one of the individual's in-between participants (other "nodes" in the network) can repeat the original message so that the listener receives the information. From the roles described above, it can be ascertained that Clients always need to connect to an Access Point to communicate while Mesh nodes may all be in direct communication with each other. It should also be noted that due to how a Wi-Fi network is designed, this also prevents different roles from connecting to each other.

Wireless Mesh Networks—Neighbor-to-Neighbor Networks

A mesh network takes the principle of Point-to-Multipoint and extends it to the idea of every node connecting to every other node that is within range of a selected node. In effect, this creates a "Multipoint-to-Multipoint" network. This requires that all the devices are in an ad hoc mode. A wireless mesh network (WMN) is a communications network comprising radio nodes organized in a mesh topology. Wireless mesh networks can also be a form of a wireless ad hoc network.

FIG. 2 demonstrates one model 200 showing how ad hoc wireless networks work. Wireless mesh nodes may, in some embodiments, be installed on the rooftops of various buildings, and those nodes that are in range and that do not have anything blocking the signals will be able to communicate with one another. These nodes will share all resources connected to them such as local servers, hosting applications, and connections to the Internet. They can also be connected to computers, Access Points, or routers inside buildings so users can access the resources anywhere on the network.

A wireless mesh network (WMN), such as the WMN 200 shown in FIG. 2, is a wireless communication network comprising radio nodes 202 organized in a "mesh topology". The wireless radio nodes 202 communicate with other wireless radio nodes 202, and with a Network Manager 204. The Network Manager communicates with a Database 206. It can also be a form of wireless ad hoc network. A mesh refers to the interconnection among devices or nodes communicating via the network. Wireless mesh networks often comprise mesh clients, mesh routers and gateways. The mobility of nodes is less frequent in mesh networks than in other types of wireless networks. If nodes constantly or frequently move, the mesh spends more time updating routes than it does delivering data. In a wireless mesh network, topology tends to be more static, so that routes computation can converge and delivery of data to their destinations can occur. Hence, mesh networks generally are low-mobility centralized forms of wireless ad hoc networks. Also, because it sometimes relies on static nodes to act as gateways, it is not truly an all-wireless ad hoc network.

Mesh network clients often comprise laptops 202, cell phones 202, and other wireless devices 202. Mesh routers forward traffic to and from the gateways, which may, but need not, be connected to the Internet. The coverage area of all radio nodes working as a single network is sometimes called a mesh cloud. Access to this mesh cloud depends on the radio nodes working together to create a radio network. A mesh network is reliable and offers redundancy. When one node can no longer operate, the rest of the nodes can still communicate with each other, directly or through one or more intermediate nodes.

One feature of wireless mesh networks is that they are capable of "self-forming" or "self-healing". A mesh network (or simply meshnet) is a local network topology in which the infrastructure nodes (i.e., bridges, switches, and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead and improve vulnerability to "hacking". The ability to self-configure enables dynamic distribution of workloads, particularly in the event a few nodes should fail. This, in turn, contributes to improved fault-tolerance and reduced maintenance costs.

Mesh topology may be contrasted with conventional star/tree local network topologies in which the bridges/switches are directly linked to only a small subset of other bridges/switches, and the links between these infrastructure neighbors are hierarchical. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. Consequently, the mesh network is typically quite reliable, as there is often more than one path between a source and a destination in the mesh network.

A mesh network whose nodes are all connected to each other is a fully connected network. Fully connected wired networks have the advantages of security and reliability: problems in a cable affect only the two nodes attached to it. However, in such networks, the number of cables, and therefore the cost, goes up rapidly as the number of nodes increases.

Wireless mesh radio networks were originally developed for military applications, such that every node could dynamically serve as a router for every other node. In that way, even in the event of a failure of some nodes, or the "hacking" of some nodes, the remaining nodes could continue to communicate with each other, and, if necessary, to serve as uplinks for other nodes.

Early wireless mesh network nodes had a single half-duplex radio that, at any one instant in time, could either transmit or receive, but not transmit and receive simultaneously. This was accompanied by the development of shared mesh networks. This was subsequently superseded by more complex radio hardware that could receive packets from an upstream node and transmit packets to a downstream node simultaneously (on a different frequency or a different CDMA channel). This allowed the development of switched mesh networks. As the size, cost, and power requirements of radios diminished, nodes could be cost-effectively equipped with multiple radios. This, in turn, permitted each radio to handle a different function, for instance, one radio for client access, and another for backhaul services, etc. A mesh network whose nodes are all connected to each other is a fully connected network.

Like any network, mesh networks are subject to threats of unauthorized access or being "hacked" by a third-party bad actor. Such threats can be reduced using some form of data encryption, user authorization, etc. Owing to the extremely short-pulsed transmissions used in PBC, the low spectral density (below environmental noise), extremely low power per wavelength distribution, large bandwidth, encryption security layers, and unique randomizing of timing codes that may be used, PBC communications have a low probability of detection and interception and provide more secure transmissions than do other communication techniques and networks. Also, recent developments in Blockchain security methods may aid in mitigating security threats and in enhancing the security of mesh networks and the information transmitted therein.

Therefore, there is a need for Blockchain-secured wireless mesh networks using pulse-based wide-band (WB) or ultra-wide-band (UWB) communication methods and apparatus (referred to herein as pulse-based communications ("PBC")). The presently disclosed blockchain-secured wireless mesh network using PBC communication methods and apparatus provides such a solution. The presently disclosed wireless mesh network combines PBC communications technologies with Blockchain authentication, encryption, and authorization techniques, Named Data Network data transmission/reception protocols, together with a plurality of software defined radios (SDRs) as the transmission/receiving network nodes. The SDR platform allows different signal processing algorithms and RF communication parameters to be implemented in software (and/or certain SDR/PBC parameters may be changed via software) making the radio more secure and sufficiently flexible to operate under changing communication environments. The integration of PBC network techniques, nodes (e.g., SDRs), and blockchain authentication and encryption processes produces very sophisticated wireless mesh networks that are flexible, very secure against third party threats and hacking, and capable of operating in the harshest communication environments. The presently disclosed communication methods and apparatus demonstrates highly survivable signal transmission capability in highly restricted environments such as operational Nuclear Reactors, metal intensive (such as naval ships) where narrowband communications tend to be challenged, and in covert applications where detection and directional location of the signal needs to be avoided. Details of the present blockchain-secured wireless mesh network using pulse-based communications (PBC) and software defined radios (SDR) are now described in the detailed description of the invention set forth below.

SUMMARY

A networking architecture that incorporates the security of Blockchain distributed ledgers as an authentication layer, while connecting mesh nodes using secure, pulse-based wide-band and ultra-wide-band communication technologies to provide a nearly undetectable, unbreakable, and dynamic wireless communication mesh architecture that can securely transmit data, voice and video over short ranges, in one embodiment, up to 1 Km, is disclosed.

In one embodiment, a Polyphonic Radio (PR) wireless mesh network is described combining advancements in pulse-based RF communications (PBC)—specifically focused on extremely short pulses that have a wide frequency response—otherwise known as Ultra-Wide-band Communications (UWB), with recent developments in the open architecture of Blockchain logic and distributed ledger systems, as well as future developments and replacements for common Internet protocol services such as TCP/IP. In some embodiments, the PR wireless mesh network combines security, encryption and other benefits provided by PBC networks, together with Blockchain authentication and encryption techniques, an established Named Data Network (NDN), and implements the resulting inventive network architecture and design using software defined radio (SDR) platforms as network nodes.

In one exemplary embodiment, a security Blockchain is developed upon network setup and upon initial network provisioning. Polyphonic Radios are registered or provisioned by a Network Administrator with a plurality of Blockchain numbers upon initial network provisioning. The individual PRs may, in some embodiments, generate a request for access. A challenge and receive process may then occur and the receive process verifies (or not) and validates (or not) the requester. If the authentication process verifies the requester PR as authorized, the process is followed by a validated reply by the requester PR to join the network.

Once joined in the mesh network, the various PRs use PBC communications to communicate with each other in the network. PBC communications include a physical layer of protection owing to the extremely low power per wavelength distribution that allows the transmission signals to fall below the noise floor. Additionally, layers of 256-bit AES encryption, as well as a software defined radio (SDR) controlled pulse coding scheme allow for a dynamic and robust cyber security protocol where information can be transferred in a virtually undetectable scheme.

The SDR platforms allow computationally extensive signal processing algorithms to be implemented in software rather than in hardware. The SDR platforms also offer a great deal of flexibility in RF communications parameters and helps the Polyphonic Radio network to dynamically adapt itself to its intended operational environment for optimal performance. SDRs provide flexibility between signal bandwidth and range, an ability to adapt to the environmental parameters and employ optimal UWB and wide-band pulse characteristics for channel equalization and robustness.

In some embodiments, the PR PBC wireless mesh network advantageously uses a Named Data Network (NDN) protocols approach when communicating data in the network. In accordance with this approach, regardless of the source of the data, information is provided to a selected PR and received from the selected PR based upon an NDN network security profile assigned to the selected PR when it joins the network. If a specific PR is potentially compromised, the NDN network security profile can be disabled immediately such that the specific PR can neither receive nor transmit any data to and from the mesh network.

Some exemplary applications or use cases for the inventive PR wireless mesh network are described. For example, in some embodiments, the PRs may be used as small unit tactical radios to provide information to a unit commander thereby assisting the commander in making tactical decisions to meet mission objectives. The PRs provide this information which is needed by the commander in order to make correct decisions to achieve the goal of the operation. Other applications are described wherein the PR wireless mesh network assists in achieving the objectives of "swarm" operations. Swarm operations are defined herein as operations including many vehicles or users that need to be coordinated to achieve an operational objective. Exemplary swarm operations include the coordination of unmanned drones (for delivery of packages, in one example) and driver-less vehicles (to improve traffic flow).

The details of one or more embodiments of the invention are set forth in the accompanying drawings and the description below. Other features, objects, and advantages of the invention will be apparent from the description and drawings, and from the claims.

DETAILED DESCRIPTION

The presently disclosed blockchain-secured wireless mesh network using pulse-based wide-band or ultra wide-band communication (PBC) methods and apparatus enable secure, robust, and dynamic tactical networking between nodes of a mobile network architecture.

Figure 3:
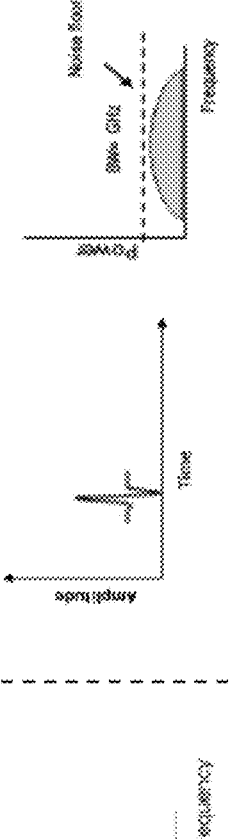
FIG. 3 shows the advantages of UWB/Pulse based signaling to the conventional narrowband continuous waveform signaling.
Figure 3:
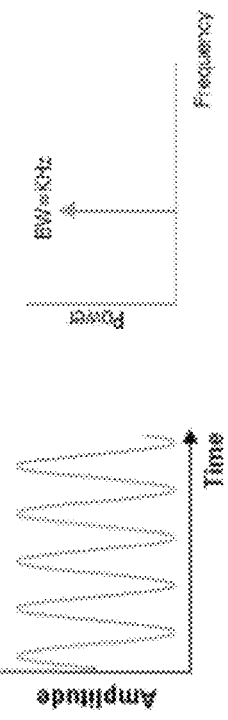

Originally developed and advanced by Lawrence Livermore National Laboratory (LLNL), Ultra-Wideband (UWB) and Wideband Communications systems showed promise in providing a more reliable, survivable communications forum over short distances (under 5 KM) earth-based, and further distances in a space-based environment. The combination and direct application of this approach is referred to herein as Pulse Based Communications (PBC). As noted in the background of the invention described above, PBC demonstrates highly survivable signal transmission capability in highly restricted and very harsh environments such as operational Nuclear Reactors, metal intensive (such as naval ships), etc. PBC is superior to other forms of wireless communication such as narrowband communications that are challenged in these environments. PBC also provides tremendous advantages in covert applications where detection and directional location of transmission signals need to be avoided. FIG. 3 shows the advantages of UWB/Pulse-based signaling to the conventional narrowband continuous waveform signaling. As shown in FIG. 3, traditional RF systems use narrowband signaling (continuous waveform, with high power and narrow frequency band) to transmit/receive data. The key disadvantages include the following: these networks are vulnerable to signal jamming and "spoofing"; these networks provide limited penetrability in harsh environments; these networks are easy to detect and intercept signals that are transmitted over these networks; these networks have a low channel capacity (data rate); these networks exhibit a relatively low precision in localization; these networks require sophisticated encryption techniques and complex hardware.

UWB based systems use narrow pulses (sub-nanosecond duration, with low power, ultra-wide frequency bands) to transmit and receive data. As shown in FIG. 3, the key advantages of UWB based systems are: such networks are resistant to signal jamming and tampering; such networks provide good signal penetration in harsh environments, these networks provide secure transmission using pulse-coding; these networks provide relatively high channel capacity (data rates); UWB networks provide accurate ranging and geolocation; UWB based networks provide inherently encrypted pulse coding; and they allow a relatively simple architecture implementation, providing for small form factors and low cost solutions.

Ultra-Wide Band (UWB)/Wide Band (WB), or Pulse Based Communications (PBC), allow for dynamic use of bandwidth while being able to transmit data, voice and video over aircraft sized distances (in some embodiments, less than 1 KM) and even greater distances at low power. Mesh UWB/WB networks adhere to the IEEE 802.15.5: Mesh Networking standard. IEEE 802.15.5 provides the architectural framework enabling WPAN devices to promote interoperable, stable, and scalable wireless mesh networking. This standard is composed of two parts: low-rate WPAN mesh and high-rate WPAN mesh networks. The low-rate mesh is built on IEEE 802.15.4-2006 MAC, while the high rate mesh utilizes IEEE 802.15.3/3b MAC. The common features of both meshes include network initialization, addressing, and multi-hop unicasting. In addition, the low-rate mesh supports multicasting, reliable broadcasting, portability support, trace route and energy saving function, and the high rate mesh supports multi-hop time-guaranteed service. The IEEE 802.15 standard (and all of its sub standards) are hereby incorporated by reference herein as if set forth in full.

As defined in the above-incorporated IEEE standards, PBC networks include a physical layer of protection owing to the extremely low power per wavelength distribution that allows the transmission signals to fall below the noise floor. Additionally, layers of 256-bit AES encryption, as well as a software defined radio (SDR) controlled pulse coding scheme allow for a dynamic and robust cyber security protocol where information can be transferred in a virtually undetectable scheme.

The prior art is replete with exemplary UWB and WB (referred to hereafter as "PBC") communications methods and apparatus, some of which were invented by some of the co-inventors of the presently disclosed wireless mesh methods and apparatus. For example, U.S. Pat. No. 8,102,955 discloses a multi-pulse frequency shifted technique using mutually orthogonal short duration pulses to transmit and receive information in a UWB multi-user communication system. The multi-user system uses the same pulse shape with different frequencies for the reference and data for each user. U.S. Pat. No. 7,194,019 discloses a modulation scheme for UWB communications that utilizes multiple orthogonal transmitted-reference pulses for UWB channelization. The UWB receiver samples and matches the shape of second order statistical functions rather than just a shape of the received pulses. US patent application Pub. No. 20050286610 discloses an UWB communications method and system that provides self-organization for wireless sensor networks. The self-organization is in terms of scalability, power conservation, channel estimation, and node synchronization in wireless sensor networks. U.S. Pat. No. 8,451,164 describes a radar communication system including a plurality of radars having a communication range and being capable of operating at a sensing frequency and a reporting frequency, wherein the reporting frequency is different than the sensing frequency, each radar being adapted for operating at the sensing frequency until an event is detected. U.S. Pat. No. 9,537,604 discloses a method for adaptive Radio Frequency (RF) jamming wherein an RF spectrum is dynamically monitored; undesired signals are detected in real time from the RF spectrum, and a directional countermeasure signal is transmitted to jam undesired signals. The above-cited prior art patents and published patent application are hereby incorporated by reference herein as if set forth in full.

Polyphonic Radio (PR) Wireless Mesh Networks

The methods and apparatus are referred to herein as "Polyphonic Radio" wireless mesh networks, or "PR" networks. Polyphony is defined as a type of musical texture consisting of two or more simultaneous lines of independent melody, as opposed to a musical texture having just one voice, monophony, or a texture with one dominant melodic voice accompanied by chords, etc.

Figure 1:
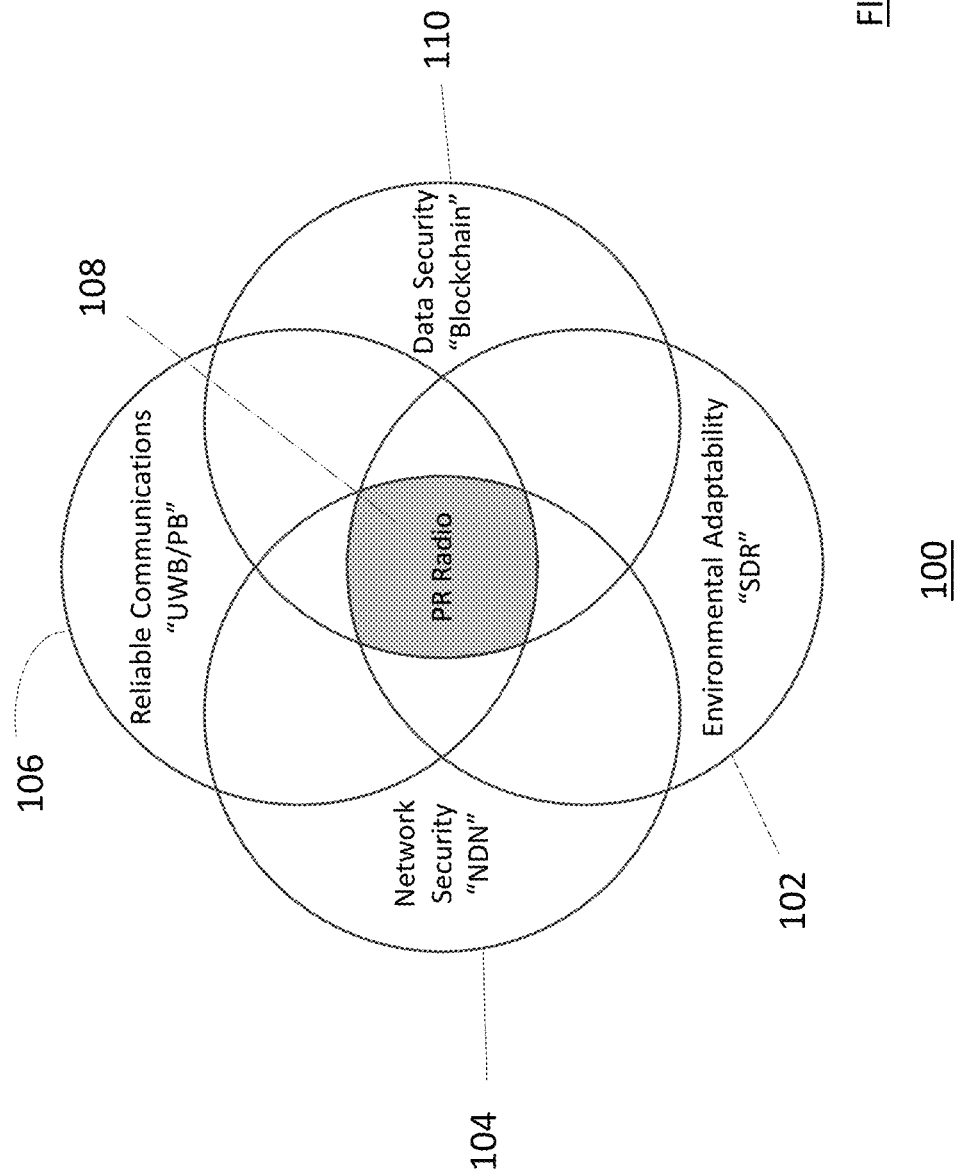
FIG. 1 shows a Venn Diagram demonstrating how Polyphonic Radio wireless mesh networks made in accordance with the present teachings combine advancements in pulse-based RF communications (PBC), specifically focused on extremely short pulses that have a wide frequency response, otherwise known as Ultra-Wideband Communications (UWB), with recent developments in the open architecture of Blockchain logic and distributed ledger systems, as well as future developments and replacements for common internet protocol services such as TCP/IP.
Figure 2:
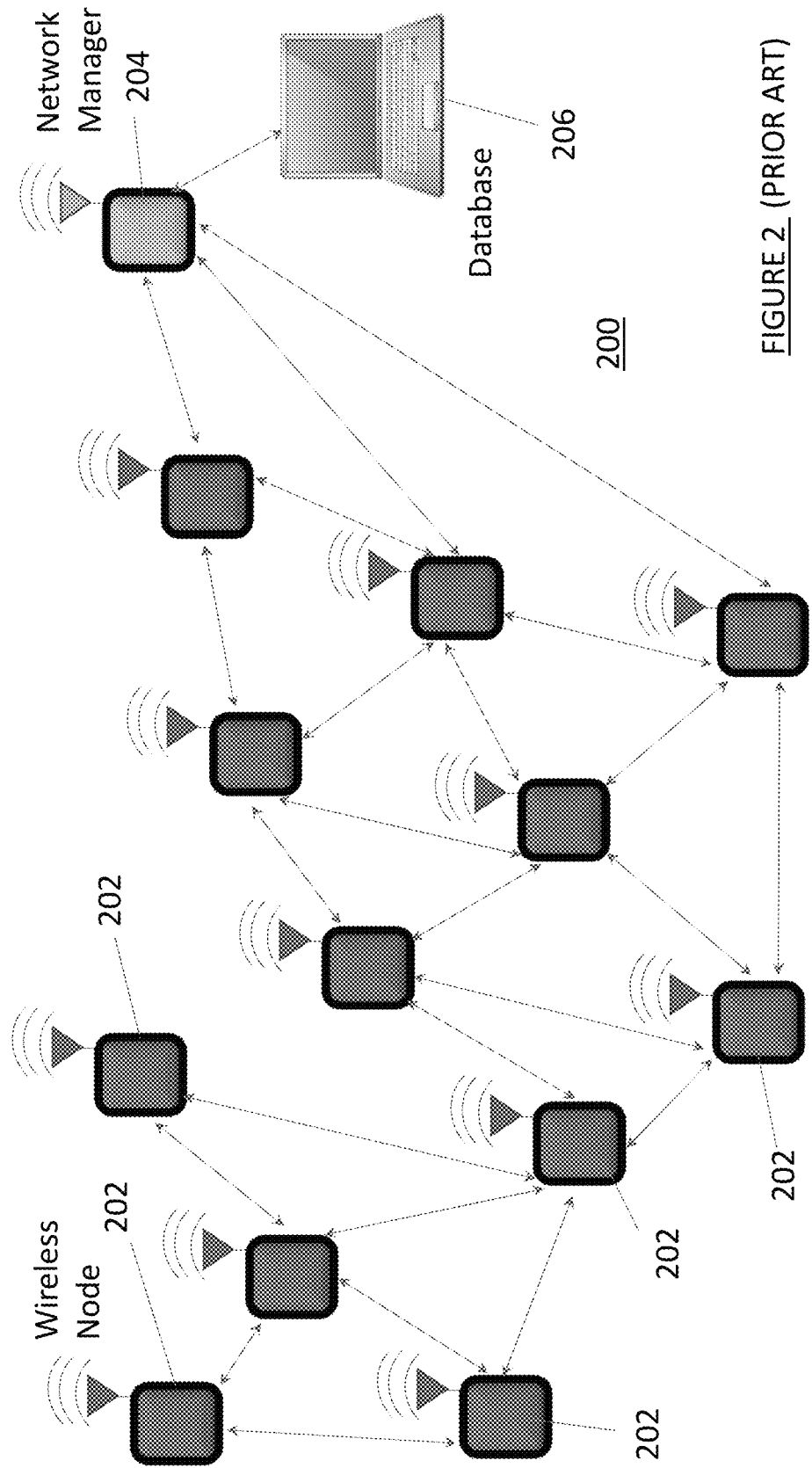
FIG. 2 shows a generic "mesh network" of the prior art. The number of nodes and the mesh topology/architecture can change depending upon the application.

FIG. 1 shows a Venn Diagram 100 demonstrating how Polyphonic Radio 108 wireless mesh networks 100 combine advancements in pulse-based RF communications (PBC) 106, specifically focused on extremely short pulses that have a wide frequency response, otherwise known as Ultra-Wideband Communications (UWB) 106, with recent developments in the open architecture of Blockchain logic and distributed ledger systems 110, as well as future developments and replacements for common internet protocol services such as TCP/IP. As described below in more detail, the present inventive PR wireless mesh network 100 combines security, encryption and other benefits provided by PBC networks 106, together with Blockchain authentication 110 and encryption techniques, an established Named Data Network (NDN) 104, and implements the resulting inventive network architecture and design using software defined radio (SDR) 102 platforms as network nodes.

Figure 4:
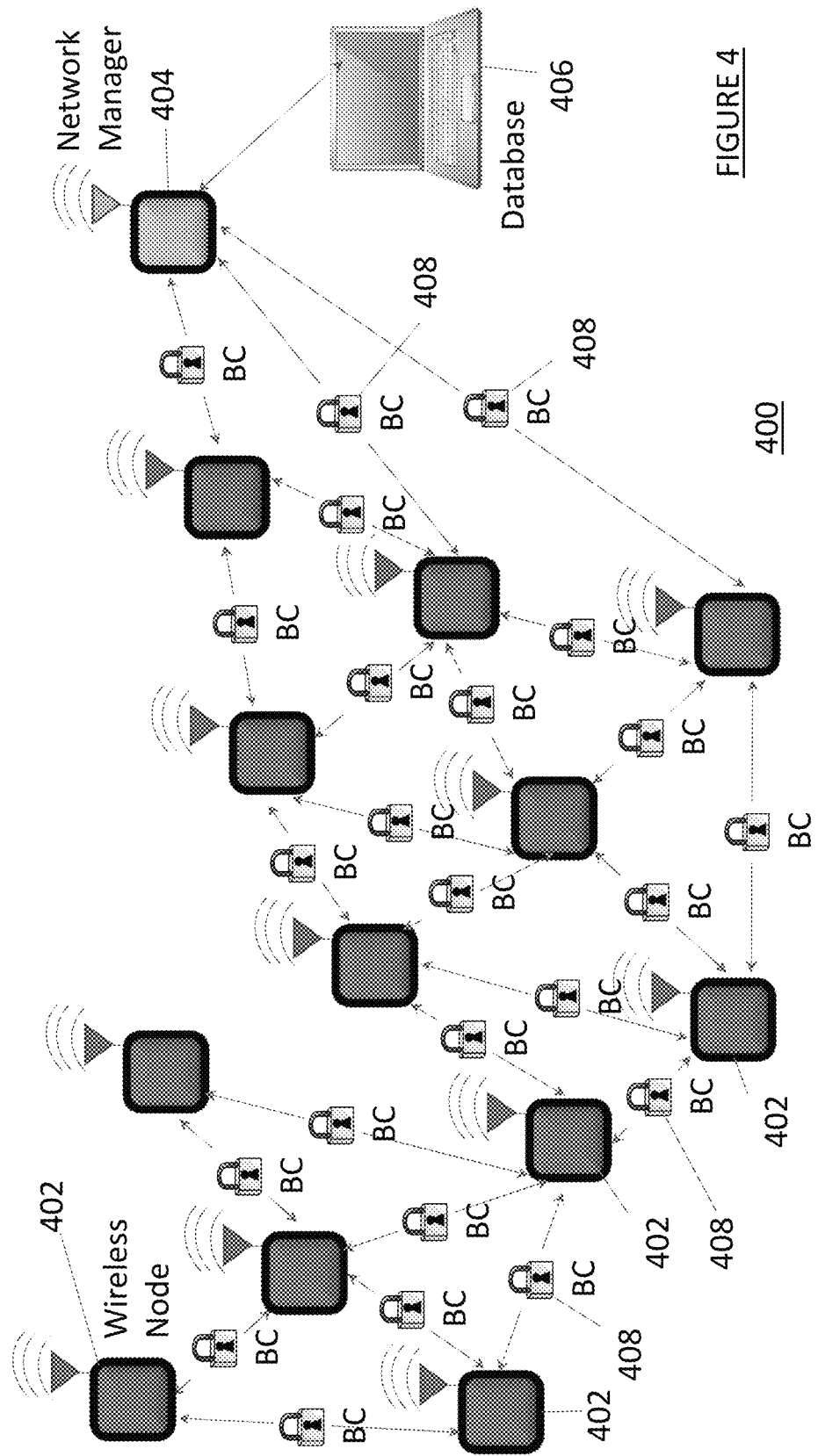
FIG. 4 shows a wireless mesh network made in accordance with the present methods and apparatus using blockchain authentication.

FIG. 4 shows an exemplary wireless mesh network 400 in accordance with the presently disclosed method and apparatus. As shown in FIG. 4, the wireless mesh network 400 includes a plurality of wireless nodes 402, in blockchain communication 408 with a plurality of wireless nodes 402, and with a Network Manager 404, which in turn is in wireless or wired communication with a database 406.

Blockchain

Coupling PBC techniques together with recently developed Blockchain security techniques adds a layer of trust and security to the PR wireless radio mesh network design and architecture. As is well known in the prior art, Blockchain is used as a distributed, transaction based algorithm that can be used to publicly share information, while keeping the details of the information shared privately within the PR mesh network. By using minor modifications of public and common forge shared scripts and adapting them to function in the present PR wireless mesh network, Blockchain security provides an ironclad approach to challenge and respond to the validation of users (e.g., software defined radios) into the network.

Blockchain authentication and encryption techniques have been proposed for various wireless communications systems such as 5G, WIFI, ZigBee, Bluetooth, and others. These networks have been used in applications such as WLAN, Internet of Things (IOT), RFID, and Body Area Networks (BAN). Blockchain authentication and encryption techniques improve security of these exemplary wireless networks and require fairly low computational complexity in implementing the security of these networks. However, because these wireless technologies all use narrowband RF signaling, not only do they face propagation challenges in hostile environments, such technologies cannot be considered as highly secure communications as the narrowband signal transmissions are rather easily detected and intercepted. Integrating the Blockchain (BC) authentication and encryption techniques with PBC communications helps in addressing such signal propagation and security challenges.

Exemplary Blockchain Applications—Cryptocurrency

Blockchain is a rapidly growing approach to distributed ledger-based verification systems that originally found a home in logistics tracking, as well as cryptocurrency. The main benefit of using blockchain (BC) as a whole is that it is extremely difficult, if not impossible to "hack" from a standpoint of security, changing recorded transactions or creating mismatched records of transactions. Blockchain is based upon the concept of using a distributed public ledger system of transactions. Instead of having one highly secure, defended ledger system (such as, e.g., a bank record of transactions), each transaction is published in the open, open to the public, and replicated across many computers in the system and ultimately across the open internet based upon the application. Each transaction is verified using crypto-logic-secured "hashes" and digital signatures. A blockchain hash is created by taking an input string of any length and producing an output of a fixed length. If one ledger is manipulated by a bad actor—it will instantly be discovered and rejected as it is compared to the broader population of BC copies. In the case of cryptocurrency, the process of each exchange of currency—each transaction and thus the transfer of goods and services for currency is recorded in a block. Then when the block is "closed", activities attempting to document said transactions have to take all the data, use it through a standard agreed upon process to then solve a mathematical equation with the data such that the product of very large numbers results in an integer with a specific number of zeroes at the end of the product. The more zeroes required, the more difficult the calculation is to find, and in some cases, many thousands of computer processing hours are required in parallel to determine the solution. Once the solution is found, the block is considered complete, and it is published to the distributed ledger. The process of solving said equations is called "mining" for blocks and depending upon the difficulty of solving the equation, the amount of time required to mine more blocks can be long and intensive or short.

Blockchain Authentication—Exemplary Implementation for Use in a PR Wireless Mesh Networks In some embodiments, Blockchain authentication and encryption methods are applied to the present PR wireless mesh network architecture (400 of FIG. 4) to enhance the security of the present inventive network. Many different Blockchain techniques are known and many more are being developed, and the presently disclosed methods and apparatus contemplates use with one or more of these Blockchain techniques. One known Blockchain Authentication technique is described below and is adapted to and incorporated into the presently disclosed PR wireless mesh network and network nodes (e.g., radios). An exemplary Blockchain authentication technique is described by Rohas Nagpal in a Medium.com article dated Dec. 17, 2018 and can be found online at the following link available on the world wide web:

https://medium.com/blockchain-blog/blockchain-based-authentication-of-devices-and-people-c7efcfcf0b32. The Blockchain techniques described therein are hereby incorporated by reference herein as if set forth in full.

A process diagram is set forth below as Table 1. The process diagram is copied from the article cited above. As noted above, the exemplary Blockchain authentication method represents only one blockchain authentication technique that may be used to practice the present PR wireless mesh network. Many other blockchain authentication and verification approaches may be used to practice the presently disclosed methods and apparatus. While the blockchain approach described below is workable, there are new open source developments in blockchain on nearly a daily basis. The actual implementation of a fully functional PR wireless mesh network will be capable of adapting the best application of BC technology to the unique user application for the purpose of Polyphonic Radio wireless mesh networks.

The Blockchain process shown in the flow diagram of Table 1 is designed to be used to support third party authentication. This is because one of the main challenges in developing a blockchain are the number of times the blockchain is replicated (fully open, broadly distributed, partially open, limited distribution, vs. private, restricted distribution of the blockchain), as well as the level of complexity of the mining of new blocks in the chain. This mining process may be difficult and may take many computer hours versus a fast and simple approach. Such applications and challenges are described in more detail below. The Blockchain authentication technique shown in the flow diagram of Table 1 is now described in more detail.

The Blockchain Authentication method cited above comprises 13 steps which are now described in more detail.

These steps are summarized as follows: Step 1—comprises retrieving an RSA public key of the verifier; Step 2—encrypting the blockchain address of the requester; Step 3—sending the encrypted blockchain address to the verifier; Step 4—decrypting the encrypted blockchain address; Step 5—retrieving the RSA public key of the requester; Step 6—generating a random string and timestamp and hash; Step 7—sending the hash to the requester; Step 8—Decryption of the hash; Step 9—signing of the hash by the requester; Step 10—creating the encrypted envelope; Step 11—sending the encrypted envelope to the verifier; Step 12 decrypting of the encrypted envelope by the verifier; and finally, Step 13—verifying the digital signature. When adapted for use in the present PR wireless mesh network, the verifier is a Network Administrator or similar network controller, and the requester is a node (software defined radio (SDR)).

As described in detail in the reference cited above, "Primechain API combines the power of blockchain technology with public key cryptography to enable": secure authentication and identification of devices wanting access to the network; securing and encrypting online communications; password-less logins; authenticating DNS records and preventing spoofing attacks and uses electronic signatures. Blockchain-based authentication has the following features: signing and decryption keys that remain on the device (e.g., SDRs); verification and encryption keys stored in the blockchain; and protection against cyber-attacks such as phishing, man-in-the-middle, and replay attacks.

In one embodiment of the present PR wireless mesh network, a security blockchain is developed that is tied to the identification of each radio and is shared amongst all radios in the same "group". Each radio is assigned a link in the blockchain with its appropriate public and private RSA keys. In accordance with this approach, regardless of the Blockchain ID/public and private RSA keys, any one radio is unable to communicate with any other radios, let alone even detect the presence of other radios, unless they share a common communication "scheme", or common UWB/PBC set of communication "parameters", such as, for example, a common center frequency, pulse timing, shape, polarity and data format. The communication scheme or set of parameters are independent of any encryption algorithm used to transmit and receive data, or even in an unencrypted format. The process of setting up the common communication scheme between radios in the described PR wireless mesh network is referred to herein as "provisioning". The "provisioning" process is described in more detail below.

The Blockchain method described below in more detail is used for the sole purpose of passing along an encryption code to a radio that wishes to join a group or communications parley within the PR wireless mesh network. As such, the example quoted from the cited "Medium" article has the roles of "requester" and "verifier", in reality, the "verifier" is not necessarily a Network Administrator. Communications between radios in the PR network is therefore established using essentially a two-step process. A first step is referred to herein as "provisioning" a radio. Provisioning a radio essentially establishes the UWB/PBC communication parameters that the radio uses to communicate with other radios in the mesh network. This provisioning information may include, for example, the pulse repetition, time distances between data packets as pulses, polarization, etc. A second step is to pass along a 256-bit AES Encryption code, without which, data transmitted to or from the radio is unintelligible. The encryption code is required to correct decrypt data transmitted to and from the radio. The encryption code is passed using the Blockchain method described below. Any changes to the encryption code can be made to all users/radios in a communications group at the same time. Every radio in a communications group shares the same blockchain.

In this embodiment, assuming that each radio assigned to a group is adequately "provisioned", that is, provisioned to share common UWB communication specifications allowing each radio in the group to be detected by other UWB radios in the group, each radio within the group will possess and share, via an encrypted channel, a common blockchain list of every authorized radio allowed to join the group. Additionally, each radio will transmit the "verifier's blockchain ID" (hereto after referred as "BID")—corresponding to a block in the blockchain—unencrypted on an open channel via UWB. Thus, when a new authorized radio (possessing a BID) desires to join the group, if the new radio is properly provisioned, it will be able to request access to join the group as outlined below. Due to the low power nature of UWB communications and the possibility that a particular "verifier" is out of the immediate network, or in some cases not transmitting at all, multiple "verifiers" and their BIDs may be transmitted in the clear.

In some embodiments, when a radio is manufactured and added to a user group, it is assigned a unique radio ID that corresponds to its BID. Much like with internet protocols where each network interface card has a unique media access control (MAC) address, every radio in the PR wireless mesh network has a unique radio ID. The process of adding a radio to an authorized group involves generating the newly added radio's public and private RSA keys, and adding the radio ID together with the radio's public RSA key to the blockchain as a new block and creating its associated BID. That new block in the blockchain is then promulgated throughout the entire network and shared such that the ability to hack into and spoof access is virtually impossible as it would involve updating all shared blockchains.

According to the "Medium.com" reference cited above, a user is allowed to join the user group by detecting any of the radios operating within the group (and if it is properly provisioned for communications between radios in the group) and isolating their broadcasted BID. Within any authorized group of radios, for example, all those radios assigned to one organization, there can be multiple "parleys", or "task oriented" conversations all occurring at the same time. The various parleys will not interfere with each other nor detect one another if they do not have the identical UWB radio provisioning. Thus, a radio may be allowed to join a parley conversation, but only if it has the proper UWB provisioning, and only if it goes through the following blockchain process. The blockchain process is used to allow a radio to obtain a 256-bit AES encryption key. The encryption key is required by the radio in order to decipher the communications between radios in the group.

Step 1—at step 1, the requester retrieves the verifier's (who may be the Network Administrator or Network Manager) RSA public key from the blockchain using the received BID from the open channel. The requester passes the verifier's BID as a parameter. The output is the verifier's RSA public key.

Step 2—at step 2, the requester encrypts the requester's own BID with the verifier's 'RSA public key'. This is done using the following parameters:

Data, which is the requester's BID; and rsa_public_key of the verifier.

The output is the encrypted value referred to as encrypted_data_rsa.

Step 3—at step 3, the requester sends the encrypted_data_rsa to the verifier.

Step 4—at step 4, the verifier decrypts the encrypted_data_rsa. The parameters are: the verifier's RSA private key; and the encrypted_data_rsa value. The output is the decrypted data, which in this case is the requester's BID.

Step 5—at step 5, the verifier retrieves the requester's 'RSA public key' passing the requester's BID as a parameter. The output is the 'RSA public key' of the requester.

Step 6—at step 6, the verifier (e.g., the Network Administrator) generates a random string, timestamp and hash. The string and timestamp are stored in the verifier's private database. The hash is encrypted with the requester's RSA public key. Note—as the requester is communicating directly to the closest radio in the group (from which it received the verifier's BID on the open channel—hence referred to as a "gateway user"), the data received by the gateway user from the requester can be passed along via encrypted UWB channels to the verifier or verifiers in a mesh format. Thus, it is not necessary that there be a point-to-point communications connection between the requester and verifier.

Step 7—at step 7, the encrypted hash is transmitted to the requester.

Step 8—at step 8, the requester decrypts the encrypted hash using the requester's RSA private key. The output is the decrypted data, which in this case is the hash.

Step 9—at step 9, the requester signs the hash using the requester's Blockchain private key. The output is the digital signature.

Step 10—at step 10, the requester creates an encrypted envelope containing the digital signature, the requester's Blockchain address, and the hash. The output is the encrypted value.

Step 11—at step 11, the requester transmits the encrypted envelope to the verifier.

Step 12—at step 12, the verifier decrypts the encrypted envelope. The output is the decrypted data.

Step 13—at step 13, the verifier verifies if the digital signature is authentic or inauthentic. The verifier processes the following parameters: the data to be verified, the requester's BID, and the digital signature. The output is true if the digital signature is valid else the output is false. If an error occurs during processing the output is false and the method must be repeated starting again at Step 1. If the signature is valid, the entity is verified as authentic. The verifier may also use a stored timestamp to confirm that the signature returned within a pre-set interval (e.g., 30 seconds).

At this point, having verified that the requester is an authentic user, and given that the requester radio has the proper UWB provisioning (which is assumed because the requester radio is able to detect and communicate via the open channel), the verifier can then transmit an encrypted message to the requester via the mesh network and via the open channel using the requester's RSA public key. The encrypted message includes the current 256-bit AES encryption key which allows the requester full access to the PR network, group and/or parley.

Using Blockchain in Combination with PR Wireless Mesh Networks

Assuming that a common Blockchain exists on two separate Polyphonic Radios (PRs), that are identical and independently loaded by an authorized user, the blockchain authentication process set forth above describes how software that is executed on the individual PRs can generate requests to join a network over a common "open" channel using public and private key structures. The individual PRs may, in some embodiments, generate a request for access. A challenge and receive process may then occur and the receive process verifies (or not) and validates (or not) the requester. If the authentication process verifies the requester as legitimate, the process is followed by a validated reply by the requester to join the network.

The advantage of this approach is that there is no transmission of key structure in the clear (i.e., publicly) that can be intercepted by a third party. All encryption and decryption are performed within the individual PRs. Once a requester has been validated, the specific point-to-point radio encryption scheme can be sent to the requester securely such that it is impossible to decode the communications encryption (even if the transmissions are intercepted) unless a hacker specifically possesses the entire BC authentication scheme. Additionally, new users are added to the network (who possess an approved BC scheme) without having a username and password that can be obtained through nefarious means such as phishing or generation of fake contact requests and is performed on a software level without requiring humans in the loop. Finally, this approach allows the full ability to use electronic signatures in the background base level of communications, which, in turn, makes the process more streamlined and secure when compared to the prior art wireless networks.

PBC networks using PRs as network nodes and coupled with a blockchain authentication scheme (in some embodiments, using the blockchain authentication scheme described above) offers a very secure and robust solution for multiple user networks in hostile RF propagation environments, with high data rates, and with security features such as immutability, decentralization, transparency and privacy. Integrating Blockchain technology with UWB or PBC technologies, yield many advantages.

The main advantages of UWB (or PBC) signaling compared to narrowband signals are: (a) low probability of detection and intercept of transmissions; (b) good signal penetration in harsh propagation environments; (c) secure transmissions owing to the pulse coding and a physical layer of encryption provided by UWB; (d) high channel capacity (data rate); (e) simple network architecture having a small form factor and low costs; (f) co-existence with legacy radio services; and use of unlicensed spectrum which lends itself to global operations.

The main advantages of Blockchain Technology are: (a) supports security and network management; (b) decentralized networking to prevent security bottlenecks (cyberattacks), single point failures and network congestion; (c) network simplification due to decentralized architecture resulting in significantly lower operational costs as compared with other wireless mesh networks; (d) seamless on-demand user access and multiple user requests without bottleneck issues; (e) strong immutability provides a high degree of security and better system protection capability against denial of service (DoS) attacks and threats; (f) new authentication by smart contracts, which provides highly flexible and efficient user access control mechanisms via access rules and intelligent coding logics. Instead of relying on an external public key infrastructure, contracts may automatically authenticate user access, detect threats and discard malicious access from the wireless mesh networks in an autonomous manner without revealing user information; (g) strong data protection by publishing user data to the Blockchain ledger where data is signed by hash functions and appended immutably to Blockchain blocks; and (h) immutability reduces vulnerability to information modifications and attacks caused by adversaries or third parties.

As is obvious with the advantages of the technologies described above, combining the UWB (PBC) physical layer encryption with Blockchain offers a significantly strong secure wireless network while communicating in hostile environments with low probability of detection and intercept. It should be noted that the encryption key described herein (encryption on the UWB channel which is passed once the challenge and verify process have completed via blockchain) is described as a "256-bit AES encryption key". While this encryption method is an industry standard today, those of ordinary skill in the data encryption arts shall recognize that the present PR wireless mesh network contemplates the use of any useful encryption technique and that the claims are not limited to use of only a 256-bit AES encryption key. Other encryption techniques may be used to practice the disclosed PR wireless mesh network.

Named Data Network in Combination with Blockchain Authentication and PR Wireless Mesh Networks In some embodiments, the present PR PBC network advantageously uses a Named Data Network (NDN) protocols approach. Communication takes place between the various nodes (e.g., PRs) of the PBC wireless mesh network.

Conventional TCP/IP Networking Vs. "Name Data Networking"

Figure 5:
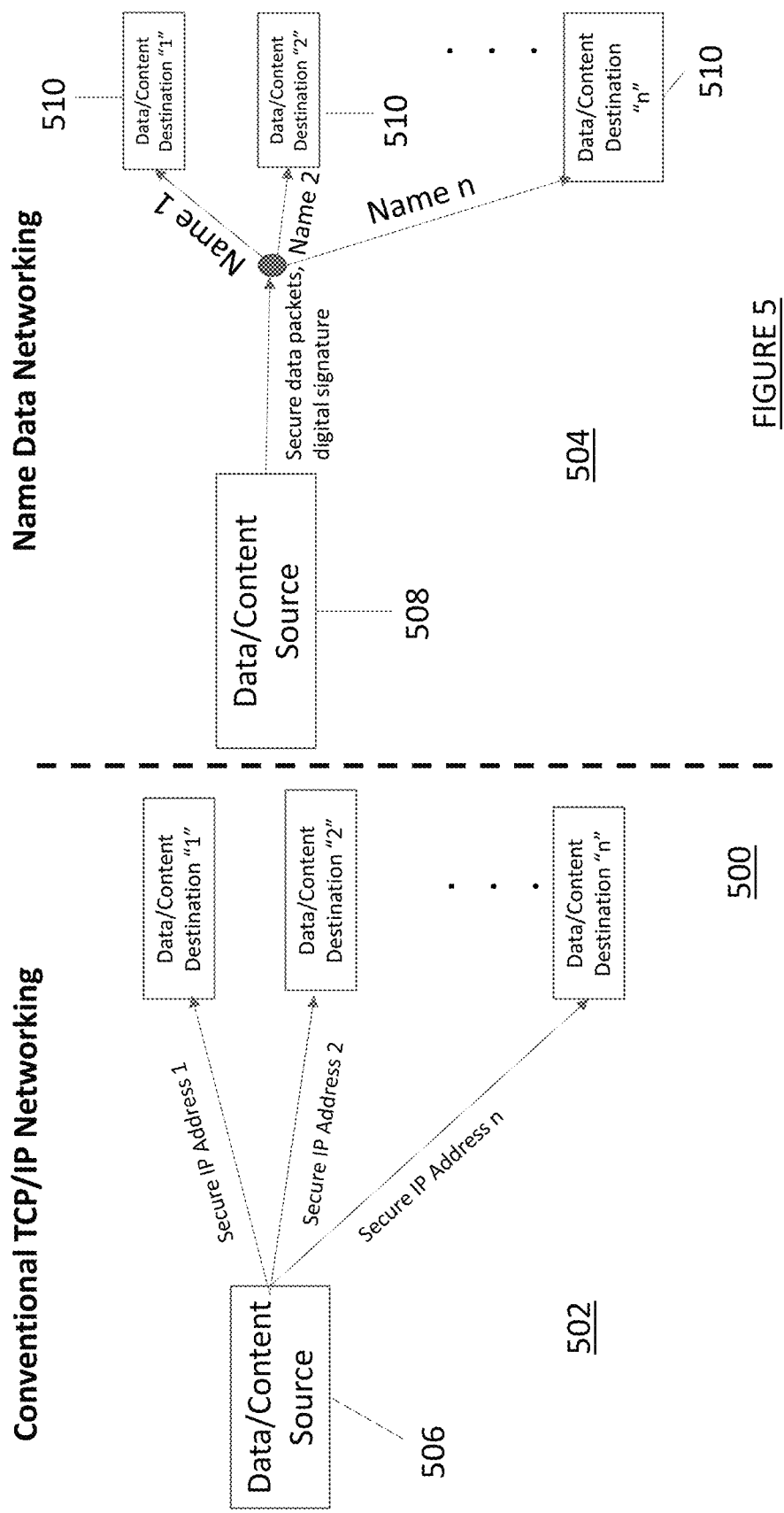
FIG. 5 shows a block diagram of a conventional TCP/IP network and a Named Data Network.

For background purposes, the NDN approach is compared with the more common TCP/IP protocol approaches. FIG. 5 shows a functional block diagram 500 comparing conventional TCP/IP networks 502 with Name Data Networks 504. As shown in FIG. 5, both networks 502, 504 include Data/Content Source providers 506, 508, respectively. However, as shown in FIG. 5, the Name data Networks deliver secure data packets using digital signatures and delivery content to a plurality of "Data Content Destinations" 510 based on a name (such as shown in FIG. 5, a "Name 1", a "Name 2", etc., to a "Name n"). As set forth below, the present methods and apparatus advantageously uses Named Data Networks such as the Name Data Network 504 of FIG. 5 in some embodiments to implement the presently disclosed PR wireless mesh networks.

As noted above, Named Data Network devices are superior to the commonly networked devices that use TCP/IP approaches. In common internet connected computer nodes, TCP/IP transmission control protocol/internet protocol was the original system of orchestrating networks of computers to communicate with one another. TCP/IP networks were designed to provide the most flexible, easy and expandable means of connecting computers across the globe to each other. The typical TCP/IP networks were designed and implemented without any thought of protecting information or information security. Thus, when one user accesses a single node in the network, the user can branch out and mine data from any other network connected node. This is the approached typically used by "hackers" today. By using social engineering, hackers can find a relatively easily obtained means to glean personal information and passwords away from users such that they can gain access to one computer in the network. Once that network is breached, hackers can then use the trusted network data tables and TCP/IP structure to find and exploit other computers in the network.

The use of new application protocols such as the Named Data Network (NDN) have been generated to address exactly such security challenges as described above. TCP/IP based computer systems all have an internet protocol unique connection ID. This is referred to as the "media access control" or "MAC" address. When connected to the internet via cable or wirelessly, each MAC address is registered within the local internet to a unique IP address within the network. Queries for information can be transmitted between computers in that specific network, or outside the network via a router, to an internet service provider. This allows access to broader IP address services. The broader IP service provider resolves a particular website name (i.e., www.google.com) to a particular router/website IP address. Each internet function, email, or bit of information on a TCP/IP based network has a requester, a provider, and several layers of location-based information to allow data to flow via bits and packets. If the stream of packets is interrupted, intercepted, etc., hackers may obtain information, spoof, destroy, or change the information for their benefit. Named Data Networks provide a better and more secure networking approach.

Named Data Network (NDN)

In a Named Data Network, the information layer is NOT location based, nor is it based on a particular IP address. This protocol allows shared distribution of data securely. Security is engineered into the architecture (rather than applied after the fact as is done in other types of networks.). Large files, live data streams, and time sensitive information can be shared by name more quickly than in a TCP/IP network format.

In a Named Data Network, the concept of delivering and receiving data is based on the Name of the Data (or data type) as opposed to more traditional communication networks which determine what data to transmit to or receive based on an IP address. In a Named Data Network, the IP address is no longer used to determine and define an entity or node connected to the network. Rather in an NDN, the entities communicating therein are defined by the name of the data to be transmitted or received from that entity. Entities in the network are defined by the name of data or information that the entity needs to transmit/receive. For example, in an NDN the concept is to communicate data answering questions such as "have you seen this content" and "who needs this content?" This is in stark contrast with the traditional networks that determine routing paths to a particular terminus in the network.

Described differently, regardless of the source of the data, information is provided to an entity and received from that entity based upon the NDN network security profile assigned to that entity when it joins the network. If the entity has the most access and needs all the information, nothing on the network is restricted from its view. If the entity has limited means or needs to see video information, and only needs the network for reporting of periodic data, that entity may not be able to even have access to any data. That entity may not even be aware there is data on the network. However, that entity might have the ability to provide data to the network. Furthermore, in any case where a specific user has been potentially compromised, the security profile of that user can be disabled immediately such that they can neither receive nor transmit any data to and from the network. This approach makes the NDN far more secure and easy to manage from a hacker security perspective.

Software Defined Radios (SDR)

In some embodiments, the nodes communicating on the presently disclosed PR wireless mesh networks comprise Software Defined Radios (SDRs). Implementing specific radio aspects of the BC/PBC network using SDRs allows the computationally extensive signal processing algorithms to be implemented in software rather than hardware. Furthermore, the SDR platform offers a great deal of flexibility in RF communications parameters and helps the Polyphonic Radio (PR) network to dynamically adapt itself to its intended operational environment for optimal performance. In an SDR-PR wireless mesh network, the RF communications parameters, such as for example, operational frequency, transmit power, pulse shape, delay between the transmission pulses, pulse polarity, etc. can be changed and optimized on-the-fly. The SDRs are not limited by hardware and their functionality and operational parameters can be changed by software. More specifically, when it comes to narrow pulses, such as wideband and UWB systems, delay implementation in hardware become very challenging, especially for low power hardware implementation. Owing to the flexibility of the SDRs, a complete change in the UWB modulation scheme is possible simply by making a software upgrade. This results in a multi-functional radio having operational adaptability, and reconfigurability without the costly changes in the traditional hardware-based radio designs. In hardware-based radios, cross functionality is only possible through costly and time-consuming physical changes to the hardware such as, for example, a complete re-deign of a board level design, or Application Specific Integrated Circuit (ASIC), or a System-on-a-chip (SOC).

In contrast to software defined radios, in a hardware-based radio, the data signal to be transmitted is connected via a mixer to an oscillator. The qualities of the oscillator, including any frequency drift, amplitude, etc., determine the radio's range, detectability and the physical characteristics of the signal. The mixer operates to modify the oscillator's output in a manner such that the carrier signal and the manner that it is modulated contain the data to be transmitted. This signal is then amplified and transmitted. The receiver works in a backwards manner to the transmitter in order to process and recover the signal modulation from the carrier using the receiver's oscillator(s). The receiver decrypts and decodes the transmitted signal to obtain the final output. The entire communication process is directly tied to the selection of hardware oscillators, amplifiers, etc. In contrast, Software Defined Radios, especially those using Ultra Wide Band (UWB)/Pulse Based Communications (PBC) are not so limited.

In UWB/PBC radios the center frequency is "selected" based upon the width of the pulse used to generate the signal. Because frequency has an inverse relationship with time, the shorter the pulse, the higher the center frequency. The ultra-wide-band response is the result of harmonics created by having the electromagnetic energy turned on and turned off. UWB/PBC communications have a series of pulses that have extremely fast rise and fall times. Thus—in a PR, the signals/information are encrypted, and then encoded into a data scheme consisting of digital "1" and "0" pulses. The specific shape of the timing in between the bits of data pulses and the nature behind how "sharp" the pulses can be created results in the pulse encoding and channelization scheme. The physics behind the creation of the pulse encoding and pulse shapes are fairly straight forward. Proper selection of the pulse width used as a baseline unit of data dictates the center frequency, and the nature of how fast the rise and fall time of the pulses are dictate the resultant bandwidth response.

In some embodiments, the SDR, via software applications, receives the data to be transmitted, encrypts the data as described in the blockchain description above, then encodes the data into the "data stream" of individual digital "1"s and "0"s, preparing it for transmission. It is in this stage, that the SDR then can coordinate "channelization"—allowing for multiple parleys to share the same bandwidth without interference. This is done by altering the polarization of the data, as well as the characteristics of pulse timing, data organization and other attributes that are readily changeable using software. The pulse train is then amplified for transmission. Because the Federal Communications Commission determines that all pulse-based communications below certain thresholds of Part 15 of their regulations will not interfere with other communications devices, they do not mandate specific channel protocols and consider these "unregulated" transmissions. Thus, as long as the PR meets the FCC standards, there will be an unlimited unregulated means of using PR for broad-based communications, ostensibly over shorter distances than narrowband communications.

Polyphonic Radio networks provide a compilation and integration of the three main components to a tailored end-user need based upon the design of the network, end user experience, and the security level and applications of the system as a whole. The three main components being Pulse Based Communication (PBC), Blockchain Authentication (BC), the establishment of a Named Data Network, and all coordinated through software defined radios (SDRs).

SDRs provide flexibility between signal bandwidth and range, an ability to adapt to the environmental parameters and employ optimal UWB and wide-band pulse characteristics for channel equalization and robustness, and finally the capability to easily adapt to current communication infrastructures, such as personal computers. Furthermore, similar to the communications parameters, the security algorithms of the PR wireless mesh network can be implemented in the SDRs, and their parameters can be changed in software, allowing for various layers of security via software upgrades. In some embodiments, an Ultra-secure SDR-PR network can be implemented on general purpose processors (GPP), Field Programmable Gate Arrays (FPGA), and programmable ASICs and SOCs.

Once the challenge and reply authentication process is completed for a radio newly joining a parley, the newly joined radio possesses the encryption that is layered on top of the PBC to allow it to pass and receive information and data with all other PRs in the network. For all PRs operating at this level, the network's encryption (for example, the 256-bit AES encryption code) can be passed to all radios in a secure manner. This function allows the network to change encryption on a regular basis without interrupting communications. In the event of suspicion that a potential node in the network is compromised, or any other decision to change the network's broader encryption code, or a decision to change other parameters on a global basis, a network "kick" function is initiated. The Network Administrator controls whether or not a kick function is initiated.

As part of its computing and application space, each PR radio has an ability to record and document all of the other radios that the radio is in direct contact with across the PR wireless mesh network. While this ability may be accomplished, in concept, using a simple "table", it is typically accomplished using a database that is continuously updated. One of the benefits of incorporating an NDN is the ability to constantly transmit data in a "named" type fashion. One such form of data can be referred to as "heartbeat" data. Heartbeat data is described in more detail below. As described below in more detail, the heartbeat data comprises a constant stream of current health conditions associated with the radio and/or its user. For operating machinery heartbeat data may comprise the temperature of an engine. For a computing system heartbeat data may comprise processor loading information. For a PR monitoring and providing communications for human operators, the heartbeat data may comprise a continuous heartbeat pulse received from the human operator. Regardless of the actual implementation, the heartbeat data helps to implement a concept that one node in the mesh network is in direct connection with another node in the mesh network.

For example, a PR #22 may receive the heartbeat information directly from a PR #65, and vice versa. The fact that the PR #22 detects PR #65 is noted in the live database until such time as PR #22 stops receiving the heartbeat directly from PR #65. Note that if the heartbeat data received is coming from another PR wherein the other PR relays the PR #65 heartbeat data, the database (or "table") is not updated. Thus, each PR keeps a list of all of the PR nodes in the mesh in which they are contact with directly, and from which it receives heartbeat information. In this manner, when a new node (e.g., a radio) attempts to join the network, even if the node (e.g., a radio) might not be in direct point-to-point contact with the network administrator/"verifier", the challenge and receipt of the authentication sequence can be passed along until it reaches the verifier, and vice versa.

Depending upon the embodiment of a particular network, the database or table maintained by each radio may reside in an isolated "container" within the SDR, wherein the container is not directly actively interfaced within the architecture that processes communications. The database or table may even be implemented on a sub-channel that is also encrypted, which follows along with the other channels whenever there is a change to network parameters (such as during a "Kick Function" as described below in more detail). In this embodiment, it would act much in the same way as a "fast order wire" line of communications that exists between a cell phone and the cell tower base station, sending and receiving dual tone multi-function "telephone signals" that get translated into the cell phone accounts maintained by the tower. In this embodiment—the tracking/handing off/maintaining the list of approved connected users is managed much in the same way that a cell tower maintains that data within its own 3G/4G/5G networks.

Kick Function

The Kick function changes the communication parameters used by the SDRs when transmitting and receiving in the PR wireless mesh network. The communications parameters include the channelization structure, center frequency, etc., up to and including encryption coding for a particular parley. The development of this feature is made much easier by making this function automatic via the SDR, rather than requiring manual input of key network parameters. When a Kick function is initiated, the Network Administrator uses a set of predetermined and pre-programmed user-defined functions to change some, part, or all of the communication parameters used by the SDRs when transmitting and receiving information in the mesh network. These UWB/PBC communication parameters are associated with channelization, encryption, center frequency, etc. The Kick function may also be used to determine whether or not to keep all members of a current parley in communication with each other after a Kick function is completed. The Kick function may be used to drop one or more radios from a given communications parley. Such decisions and pre-programmed settings are user-defined and are not described in further detail herein. However, it is important to note that the Kick function can change the way the radios communicate with each other on the mesh network, and that it can also determine which radios participate in a particular communications parley.

If for example, one selected network user/radio needs to be kicked off or removed from a current parley (because, for example, it has been compromised, damaged, etc.), the Network Administrator may initiate a Kick function to remove the selected radio from its current parley. The Kick function allows the Network Administrator to generate a list of all authorized users/radios when moving to the "next" parley. Using the table function described above, all users/radios in the current parley that are authorized to "kick" to the next parley (i.e., that are authorized to communicate with each other in the next parley) receive a new temporary 256-bit AES encryption code. As noted above, the present PR wireless mesh network contemplates use of other encryption techniques and codes and this particular code is exemplary only. The radios continue to temporally use the current UWB/PBC communication parameters that were previously established for the radios.

Each member/radio authorized to communicate in the next (or "new") communications parley then responds affirmatively that they received the new encryption code. Using the capabilities of the NDN to transmit and receive only to and from nodes/radios that are authorized to receive information (that is, all of the radios comprising the "next" or new parley), and using the new temporary encryption key, the Network Administrator transmits the new UWB/PBC communication parameters to be used by the next parley users/radios. These communication parameters include channelization, center frequency, etc. When all new or "next" parley member/radios acknowledge receipt of the new communication parameters, that new parley is then instantaneously "logged off". The next or new parley members/radios use the new temporary encryption code and channelization specifications to establish the new parley. Once the radios have re-established communications in the new parley, the temporary encryption key can be retransmitted, and used in the new parley. In this example, if one node or radio in the network is compromised, its connections to all other nodes/radios in the network would simply disappear. Because it is no longer provisioned to include the proper UWB/PBC communications parameters to request to join the new parley on the open channel, it would appear that every user/radio it was in contact with virtually disappeared.

Communications Between Parleys

By including a Named Data Network together with the PR concept, Network Administrators can decide how much, what type and from which nodes/radios data can be shared outside of a communications group or parley. If two separate parleys are operating in close proximity to one another, using different communication channels and using different encryption keys, the two parleys will not interfere with each other. The two communications parleys will essentially be blind to one another, save for the fact that they may belong to the same user group (yet organized into two different communication parleys). If data from one communication parley might be beneficial to another (for example, if a "video feed" might be beneficial to a parley), a Network Administrator from one parley could contact the Network Administrator from the other parley via the open channel. Because any user could be designated the "verifier" or "administrator" role based on how the NDN is setup, every radio has the ability to maintain multiple parleys on a per radio basis. The actual number of parleys (and hence channels) is limited by the number of independent pulse generators and data encoders that are included in each radio. As this technology matures, it is expected that this will become a feature that can be mostly encoded in software and hence would only be limited to how many complete PR independent systems can be miniaturized (ideally to the size of a single system on a chip).

In one embodiment of the present PR wireless mesh network, a Network Administrator would use a second embedded PR to contact the PR within the same group (both PRs would possess the same shared master list of BIDs and blockchains), but within a different communications parley—to establish a one-to-one parley between the two Network Administrators. Thus, data pulled off of one parley from the NDN could then be decrypted, decoded, and then passed to the other channel for encoding and encryption on the one-to-one parley—establishing a "data bridge" for the purpose of sharing specific data.

If an ad-hoc "data bridge" will not support data throughput, in some embodiments, either one of the parley's Network Administrators would be able to "kick" their parley over to the other parley using the encryption key and parley channel parameters of the other parley, passing it along to their team. Once the kick is executed, the structure, roles, parley channel characteristics and encryption are all shared between all parties. Thus, it would appear that suddenly the size of the group increased seamlessly.

Virtual Private Network (VPN) Function

Additionally, maintaining live databases in a set memory location within each SDR allows for generation of auto-routing applications to support direct "point-to-point" communications by relaying data from one node/radio to another. This is of particular importance in that it enables a second layer of encryption which is typically used in Internet Protocol (IP) based networks via the establishment of a Virtual Private Network or VPN. In a similar manner, an application can query and determine a single or multiple path "route" for information to flow to and from individual nodes/radios on the network.

Much like the "Kick Function", the ability to generate a single encrypted point-to-point communication link within a parley exists as a function managed by an application within the SDR. Using the same or similar "additional PR subnets" within a PR, one user/radio in a parley is able to identify another user/radio in the parley and send it a signal similar to the Kick function. The user/radio can send a direct message via a "fast order wire".

As described above, each user/radio maintains a list of which users/radios within the mesh they are in contact with and in receipt of a "heartbeat". This allows for the transfer of an encryption key via an encrypted channel. The encrypted channel is on a subnet not accessible by the user/radio, while it relays it to the user for which it was intended. Upon receipt of the key, the data/voice/video that requires transmission from one user to another is transmitted in a private manner, using the same channel structure, but using a different encryption key known only to the parties authorized. This allows for a private conversation where data is passed along via the current mesh. Alternatively, if the two parties/radios are in close enough proximity to be in direct contact with each other, this subnet communication could follow the above-described entire protocol of the Kick function. The two parties/radios can then establish a new parley with entirely different channelization, while maintaining the original encryption and channel structure in the original party/radio thus allowing private data exchange while maintaining the group "open" parley. This would essentially be similar to putting one audio conference call on a first line on hold, while having a private conference with a separate person on another line.

Small Unit Tactical Radio

Wireless mesh networks implemented using the presently disclosed PR radios, with BC authentication and encryption, wherein the radios communicate with each other using PBC communication techniques, and using NDN protocols, and software defined radios such as SDRs ("PR" networks for short) have advantages over the prior art radio networks. In some applications including possible use in military applications, secure communications are paramount. Such applications should prevent "hacking" and unauthorized use while allowing its users to communicate visual, speech, and data and other information via the network. PR networks operate and communicate in very harsh environments or in tactical environments where secure adaptable communications are needed and must be guaranteed to work even under the worst operating conditions. When the network is activated, more than just voice and video are shared. PR networks allow for information data flow automatically. In most ground operations, GPS coordinates are required variables. During operation, in one application without the benefit of the present PR network, it is very difficult for small unit leaders to have a good understanding of the battlespace, or know where resources are needed, or know the health and welfare of all team members, etc. This is true be they operators in a special warfare military scenario, or firefighters battling forest fires away from the main line of supply. The same communication problems and solutions exist for both types of operators. The applications of PR networks are limited mostly by the imagination of the designer, and not by the implementation of the PR networks. Using the present teachings, PR networks can be developed to suit the needs of many different specific applications.

In many applications, the first line of data communications is the "heartbeat". In such situations, the heartbeat data line may literally be the human heartbeat of the human user. Health and welfare are key aspects in such scenarios. With pulse sensors, pulse oxidation sensors, and, in the future, as sensors become more capable, even implanted sensors that detect blood characteristics, can be integrated into a common data signal that transmits constantly specific data over the PR wireless mesh network to the commander. This information is needed by the commander in order to make correct decisions to achieve the goal of the operation. It is important to know the health of the operator, the operator's position, and the time. This information can be integrated into a display where with a "God's Eye View" the commander can see the location of every team member, drill down into common statistics and status and monitor each team members' movements. When logistics is an issue (i.e., rounds loaded, rounds fired, food, water, supplies, etc.) either automatic detection of weapons status may be obtained through weapon integration that tracks ammunition requirements, or such information may be entered manually by an operator and is updated as the operator consumes food and water.

This is required to accurately manage resupply requirements of the operators. In the future, as the battlefield/firefighting line continues to evolve, the application of small unit drones used for resupply purposes will be paramount. In such situations, a commander at the rear of the operation can send a small drone ahead where it can be useful. For example, in some embodiments, a small drone could be sent forward by the commander. The drone would tag the location and/or heartbeat of an operator that is up ahead of the commander, the drone could have sufficient AI capabilities to self-coordinate, to resupply the operator with mission critical supplies, and to return to a less forward (perhaps a rear) position.

Beyond heartbeat controlled automatic data functions, in some embodiments, each operator is equipped with communications that can transmit and/or receive voice, data and video in a reconfigurable means. Importantly, because Pulse Based Communications (PBC) is used to implement the present Polyphonic Radio wireless mesh network, the power requirements are extremely low. This is because the PBC transmissions have duty cycles that are very short. Thus, the radios will last longer without a recharge, and will weigh less in carrying battery requirements. For long operations in the field and as solar recharging technologies improve, solar battery recharging stations can be integrated into wearables for each operator in order to maintain operations when power and batteries are at premium.

Also, secure communications can be utilized right up until the moment that an operation objective is achieved without the need to enforce radio silence. This is because the communications network and transmissions therein are virtually undetectable due to the use of PBC, and it is almost impossible to hack by a bad actor. Urgent updates of data such as enemy locations, an update that fires are jumping a line of defense, or reporting of injuries to operators, can be immediately communicated back to the unit leader for adjudication and decisions regarding operational changes to achieve the mission/project objective.

Figure 6:
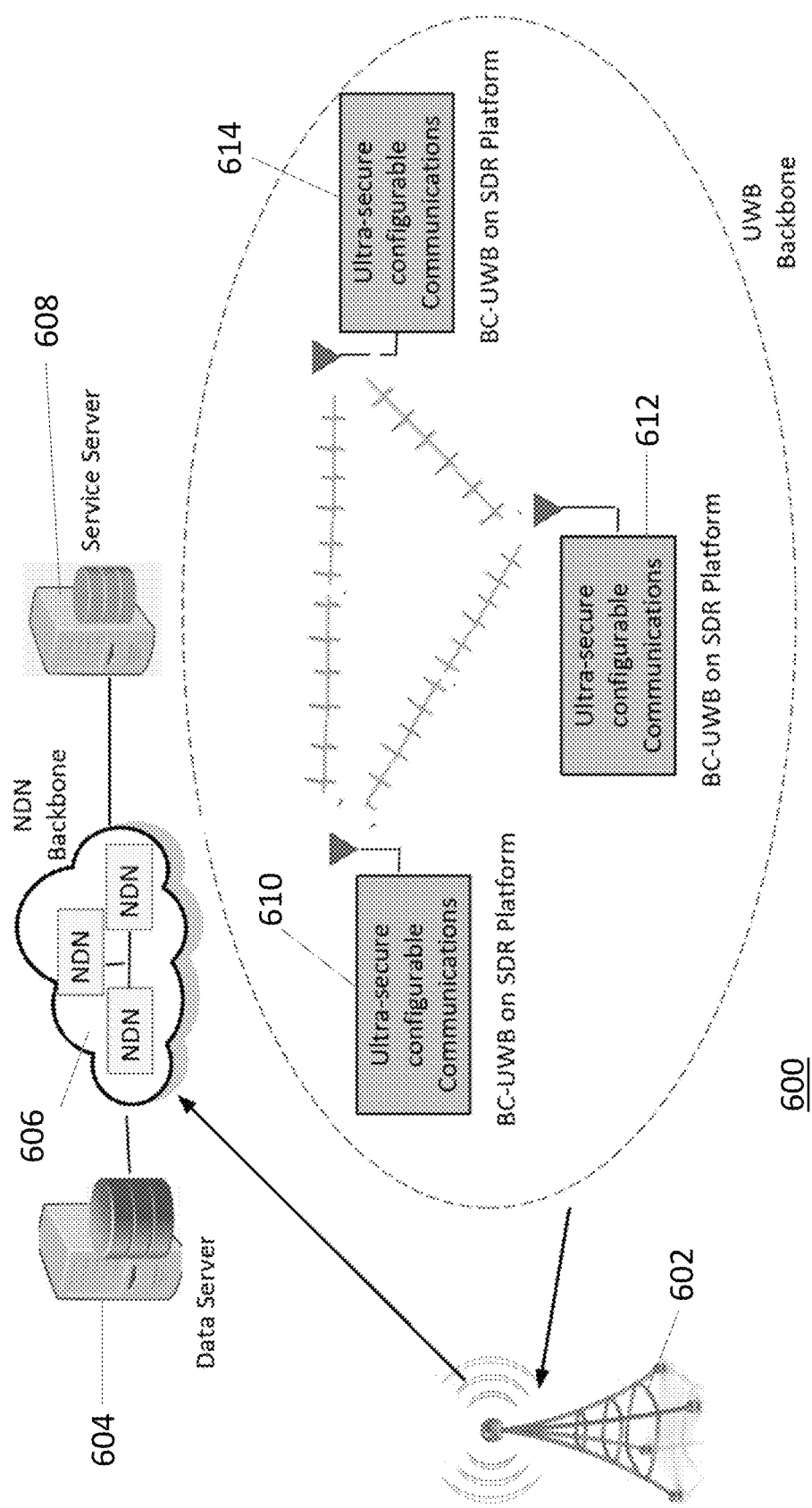
FIG. 6 shows a simplified block diagram of a PR Wireless Mesh Network that uses BC authentication and encryption techniques, PBC communications between a plurality of Software Defined Radios (SDRs), together with a Name Data Network approach to sending and receiving data, made in accordance with the presently described methods and apparatus.
Figure 7:
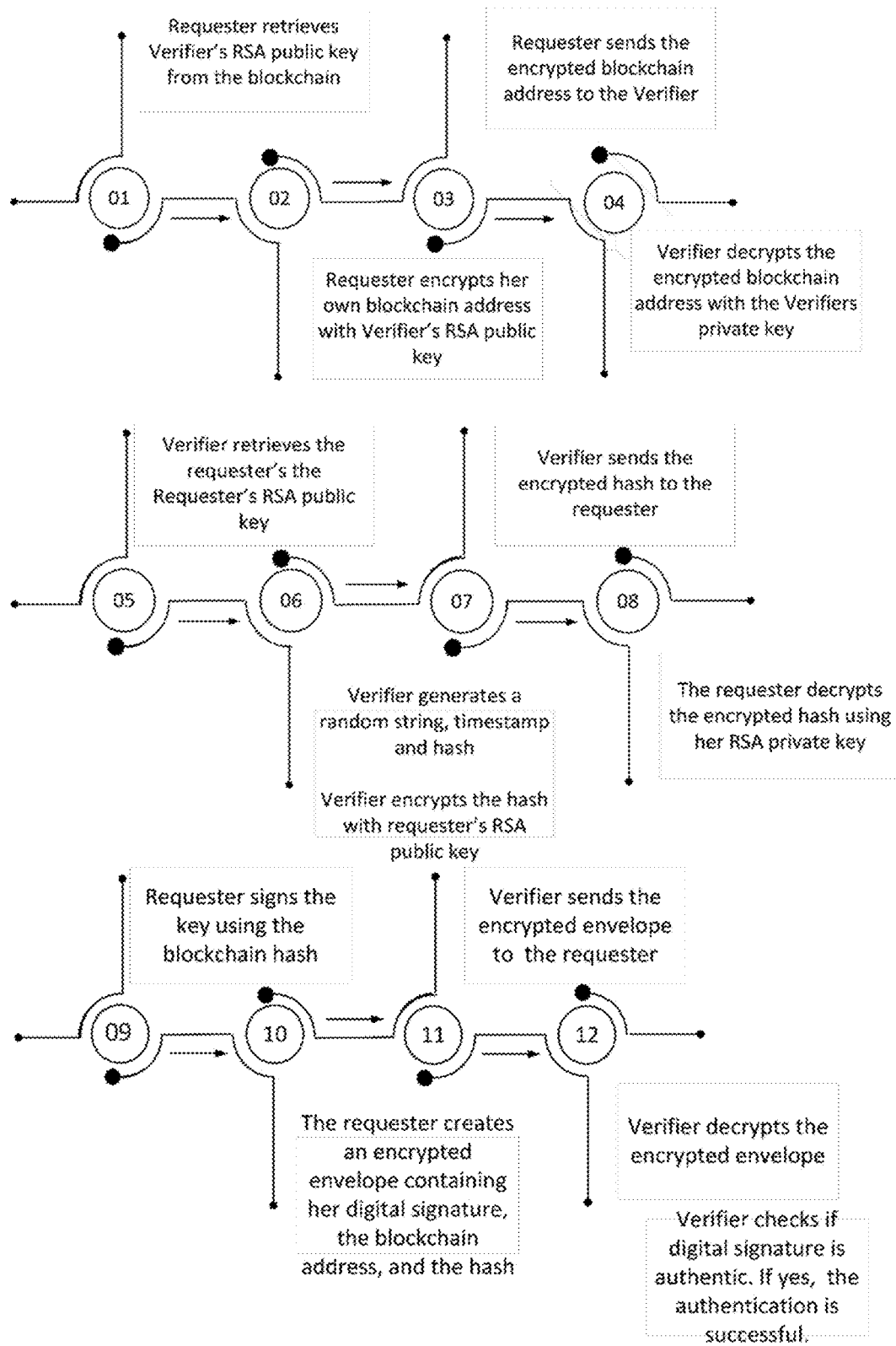
FIG. 7 shows Table 1.

FIG. 6 shows a simplified block diagram of a PR Wireless Mesh Network 600 that uses BC authentication and encryption techniques, PBC communications between a plurality of Software Defined Radios (SDRs) 610, 612, and 614, together with a Name Data Network 606 approach to sending and receiving data, all made in accordance with the presently described methods and apparatus. As shown in the PR Wireless Mesh Network 600 of FIG. 6, each of the SDRs 610, 612, and 614 are in blockchain-authenticated wireless communications with each other in accordance with the presently disclosed methods and apparatus. In addition, the SDRs 610, 612, and 614 can communicate with a base station or other Access Point 602 which in turn communicates with a Named Data Network backbone 606. The NDN backbone 606 is in communication with a Servicer Server 608 and a Data Server 604. The PR Wireless Mesh Network 600 is implemented in some embodiments in accordance with the presently disclosed methods and apparatus.

Swarm Operations

Swarm operations are defined herein as operations including many vehicles or users that need to be coordinated to achieve an operational objective. The vehicles can be either manned (piloted) or unmanned. The plurality of vehicles relay information between the various operators in order to coordinate operations, motion, and pilotage. Processing and maneuvers are coordinated so that the many vehicles act together as one unit to achieve an objective. This can be accomplished by using distributed processing, flight/pilotage management and coordination of movement in restricted traffic.

The use of a Polyphonic Radio wireless mesh networks in implementing distributed processing has many advantages. For example, traditional avionics marries a platform-based sensor together with the processor/mission computer onboard the vehicle for direct closed loop processing. In stark contrast, in a PR wireless mesh network application, while one vehicle performs a specific task and processes (captures) a signal that is not directly related to its primary function, that signal can be shared across the PR wireless mesh network to another vehicle for processing and execution. In one such an example, an unmanned aerial vehicle performing a mission associated with reconnaissance/mapping, wherein the vehicle is positionally located ahead of secondary units, may encounter a radar/jammer or counter-air battery that could pose a threat to following mission assets positionally located behind the unmanned aerial vehicle. In a PR wireless mesh networking approach, the forwardly placed aerial vehicle can continue its primary mission while other assets scanning for such threats can be relayed the information to allow them the ability to process the signal directly while not yet in receipt of the primary signal. In this scenario, the information is processed by the onboard logic of the first vehicle, transmitted out via the Named Data Network as a particular type of threat, and the secondary vehicle which is tasked as prosecuting such a threat as its primary mission can process the threat independently of the first vehicle (or any other vehicle in the network for that matter), changing or altering its mission.

When applied to package delivery applications (such as, for example, UPS®, FedEx®, and similar delivery applications), swarm operations may require "Swarm Management" of delivery resources. Swarm management is important when PR wireless mesh networks are employed in the task of package delivery via UAVs or in automobile traffic control. In the case of true unmanned swarm operations, the ability to register, apply for, and publish primary, secondary and emergency/backup air traffic routes is a challenge that is custom-made for the application of blockchain authentication/encryption techniques. If, for example, the Federal Aviation Administration adopted Polyphonic Radio wireless mesh networking techniques for use in managing complex UAV deliveries, a delivery service would register a flight plan with the FAA from a package delivery center to a local business/delivery location. Much like commercial aviation, as planes are controlled all over the world, these UAVs must follow approved flight paths just like their piloted counterparts. Primary flight paths could be developed and published as requested and approved by the FAA to follow arrival and departure at key waypoints and at selected times. Normally, managing such heavy loads of air travel might be impossible for manned operations. But if every UAV were equipped with a Polyphonic Radio, transmitting over short ranges (within a kilometer or so), each UAV could transmit its "heartbeat" information such as altitude, airspeed, heading, GPS position, position accuracy, etc. to every other UAV on the same leg, and to those approaching the next waypoint. In such a scenario—the chances of collision would be greatly reduced as each UAV could detect the heartbeats of other UAV's on their particular route, match speeds, and allow for more traffic along the same legs.

Also, in the case of piloted vehicles, and specifically automobiles, as the use of auto pilots in highway scenarios increase, studies show that with as few as 10% of the cars on the highway being piloted via autopilot, highway traffic jams may cease. This is because of the nature of human interaction. A distracted driver playing with the radio, a tired driver starting to fall asleep, results in sudden braking actions which daisy-chain across the rest of the traffic field and results in traffic delays. While we wait for the majority of the automobile population to transition and convert over to autopilots and driverless functions, the addition of small Polyphonic Radios to even a small percentage of the cars on the road could easily share common information. Common information such as speed, brake usage, alerts from other PRs on the highway (for example from cities and/or first responders proceeding to an accident) could be shared among the autopiloted automobiles. In addition, integration with popular applications across mobile devices, such as Waze, etc., could provide an added stream of information that could be fed back into cars with autopilots to further regulate and help maintain steady traffic flow.

Types of Communications within the Exemplary Wireless Mesh Networks

Communication within the mesh networks can comprise point-to-point between two nodes on the network, or one-to-many communications meant to share and/or broadcast information. When two nodes on the mesh network are not in direct contact with one another, the "ping" tables generated by the individual network nodes are used to find pathways between the two nodes in communication to relay information. Thus, data can be passed along, node-to-node, until it reaches its intended destination. For larger files and data streams, data can be shared via multiple paths to increase data flow rates. This form of data transfer is similar to "Bit-Torrent" wherein multiple shared nodes are used to transfer large files on the Internet. When data is shared in a "broadcast" format, each node acts as a repeater of the message until the entire mesh network has received the information to be communicated. As such, in some embodiments, each node maintains a data table of all messages received and transmitted for transmission integrity. Such a data table, in some embodiments, is defined by message type, latency and space available within the architecture. Voice and/or video data streams can be passed along and shared until the stream is secured and/or the voice communication is complete. Status updates, position, and related messages are stored in a rolling table where data of a certain age is deleted or overwritten due to node-based storage requirements.

In some embodiments, in addition to allowing data sharing between nodes, each node has a pre-defined role within the mesh network. These roles are, in some embodiments, designated during initial system provisioning. In some embodiments, the roles of each node are defined as follows:

a. Receiver Only (RO)—a receiver only (RO) node is capable of receiving voice/data/video information as designated during network provisioning; a receiver only (RO) node has the ability to receive a defined broadcast message from the mesh network. A broadcast acts as a repeater of network status messages. The RO node cannot send any data—only data, voice and video sent out in a broadcast format can be processed and received by a receiver only (RO) node.

b. Receiver/Transmitter (RT)—A receiver/transmitter (RT) node has all the capabilities of a receive only node, yet it can also generate signals and transmit voice, data and video. Transmissions are limited to communicating between nodes only. This node receives and transmits voice/data/and video as designated during the provisioning of the mesh network. It can both source (transmit) and sink (receive) voice/data and video information as established during mesh network provisioning.

c. Receive/Transmit/Control Interface (RTC) or Broadcaster Node—This node provides a source for voice/video/data as updated. This node has all the capabilities of the nodes/users described above, and it also has the capability of dynamically sending control signals to third party networked platforms. For example, if a small tactical awareness (UAV) is used by the network to fly ahead and/or obtain a view of the surrounding areas, the UAV would be outfitted with an RTC interface and would broadcast the video back to those nodes/users in the mesh network that are allowed to receive such information. In such an exemplary embodiment, only the ground station controller would have the RTC interface with which they can control the flight path of the UAV.

d. System Manager (SM)—This node acts as a "super user". This node can control other nodes in the network and can transmit and receive data/video/voice information at will. This role allows for complete control of the network. The SM can reconfigure the network, generate new blockchains, assign and/or change roles and control access and encryption for the network in its entirety. The SM may control other nodes in the mesh network, and transmit and receive video, data and other information at will.

The mesh network provides a dynamic, low power, low detectability adaptable means of connecting operators when security and secrecy is paramount. Each node in the mesh network, depending upon its role, has the ability to interface with the broader world and share data with other users and nodes. In one embodiment, if a node has a GPS device embedded therein, the node can send pings to record network members that can include GPS positioning information. This provides a "God's Eye View" of where all the nodes and users in the mesh network are located in real time.

In some embodiments, "Data Diodes" are used to input data and limit the ability of out-of-network operators to access the mesh network. Even if a node is "hacked" or invaded by a hostile user, such a "hacker" would be unable to hack into the mesh network because the mesh network does not use TCP/IP protocols. The hacker would not be able to "see", recognize, or contact other nodes in the mesh network. In order to obtain information from other nodes in the mesh network, the would-be hacker would have to have knowledge of the user contact tables, the blockchain security protocol and the means to access other nodes via pulse-based communication. Such a hacking effort would only be possible by accessing the node hardware directly.

Because of the nature of such secure operation, if a node's hardware is lost or if the node's user is compromised, the system manager (SM) can immediately change encryption on the pulse-based communication, re-provision the network with a new blockchain protocol and drop the lost node. In such a case, the compromised node and related hardware would never again be able to rejoin the mesh network unless and until it is recovered. Additionally, anti-tamper devices and methods may be used together in the node's hardware. Such anti-tampering devices and methods provide an additional layer of security such that the hardware will be destroyed if there are attempts to modify or reverse-engineer it.

With such a mesh network as described herein, users have the ability to communicate, share data—in an "Internet of Things" approach (for example, heart monitors, etc.), video and voice communications in a secure manner. This is accomplished while passively sharing information on location in a means that is virtually undetectable and un-hackable.

An Exemplary Application for the Methods and Apparatus of the Present Disclosure—Use in Avionics Hardware and Software Ultra-Wide Band/Wide Band (UWB/WB), or Pulse Based Communications (PBC), allow for dynamic use of network bandwidth and of a network capable of communicating data, voice and video information between network users. In one embodiment, the area covered by the disclosed mesh net is "aircraft"—sized or greater. Ultra-Wide Band (UWB)/Wide Band (WB) or Pulse Based Communications (PBC) allow for dynamic use of bandwidth while being able to transmit data, voice and video over aircraft sized and greater distances at low power, with a physical layer of protection as the extremely low power per wavelength distribution allows the signal to fall below the noise floor. Additionally, layers of 256-bit AES encryption, as well as a software-defined-radio (SDR) controlled pulse coding scheme allow for a dynamic and robust cyber security protocol where information can be transferred in a virtually undetectable scheme.

Using the technology disclosed herein regarding the improved mesh network and network nodes, potentially at a chip scale level (if required by system and network designers and users) allows for the virtual replacement of all avionics wiring and potentially flight control computer wiring on an aircraft. Essentially all avionics wiring that is not related to the distribution of power could be replaced by the present wireless mesh network and network nodes, thereby creating a dynamic, distributed computing and communication scheme. The disclosed mesh network could be used to augment or completely replace all avionics integration, allowing for blockchain level cyber security, transmission of all aircraft data to any user in any configuration, and connect voice, data and video users seamlessly throughout the aircraft. Additionally, the use and incorporation of edge computing concepts, as well as "BitTorrent—style" distributed information dissemination would quickly adapt and redefine future integration of the mesh network.

In existing communication systems, in order to evaluate and integrate new sensors, several challenges are presented to the network designer. First, additional wiring for communication and power and routing new cables throughout the aircraft must be provided. Second, a means for interpreting data provided by the sensors in a proprietary format must be provided, allowing the proprietary data to be converted and read and accepted by the aircraft's Prime Contractor/Integration Agent. These needs drive up the costs and delays in adding and integrating new sensors to an aircraft.

Using the disclosed blockchain secured mesh network methods and apparatus, every box, every radio, every "thing", on an aircraft, for example, that needs to transmit or receive data (in one form or another) would not require a wire to connect to it. Everything will communicate wirelessly using the disclosed inventive wireless mesh network. A Virtual Board (VB) chip can be developed and used to connect the chip to the PBC wireless mesh network. The VB chip will incorporate a chip scale or higher level of the wireless mesh network transmission card. Based upon system requirements, the transmission card has the native interface of the original box included with and in it. If the original box worked on an ethernet connection, it would have a TCP/IP interface. Similarly, 1553 protocols, serial connections, Wi-Fi connections, and possibly even more importantly, future connection protocols, are provided in order to interface with the UWB/WB (PBC) wireless mesh network connection.

At a base level of system security, each VB chip/card/box has a unique system code assigned to it, and some amount of independent processing power available (this is a variable which is described in more detail below). As each component connects to the broader system, it is registered to the aircraft's security system which uses a distributed blockchain approach to document and keep track of each "thing" connected to the wireless mesh network. Thus, on an organic level, no one box or no one thing can disrupt, access, hack or destroy the network protocol unless everything on the aircraft and its associated blockchain processor is destroyed. Each of the aircraft's security system processors may, in some embodiments, be outfitted with Anti-Tamper/Zeroiz functions that can be centrally controlled by an application.

The adoption and adaptation of the presently disclosed blockchain secured wireless network using PBC communications methods and apparatus allows for dynamic, agile, and multifunction communication between nodes at extremely fast rates. Simultaneous point-to-point (IP), one-to-many (i.e., 1553 protocol), and many-to-many communications can be setup, taken down, managed, and deconflicted. All in an approach which requires low power, is physically secure, and reliable. In some embodiments, all connections to the VB boxes are wireless, with the only exception being the electrical power cords the boxes require for power. In some embodiments, an AI-based network manager is used to establish requirements, direct system security, manage distributed edge computing assets, adapt swarm-based approaches (through use of "BitTorrent" like large file/large bandwidth requirements) and direct self-healing and cyber resistant functions.

There could be multiple levels of user access to such a system, for example:

Virtual Board (VB) connection—at a base level this is the means of communication and foundation of the presently disclosed blockchain secured wireless mesh network using pulse-based (PBC) (or UWB) communications methods and apparatus. It is the connection (PBC), and depending upon system requirements, and the number of VB boxes distributed around the aircraft and network health—EDGE computing capability that can be shared, reallocated and dynamically used to process large or small functions, as well as to manage and maintain Blockchain security.

Broadcast User—In some embodiments and based upon the aircraft mission requirements (which can be dynamically reassigned) a system administer level user has a receiver connection (e.g., in a "dongle") like adapter available. The system administrator user is able to receive whatever the AI based network manager allows.

Demand User—This level of user has all of the rights and privileges of a Broadcast user, but also has demand access to reconfigure the feeds they require. At this higher level of bandwidth demand, a Demand user has (this is reconfigurable—depending upon the AI based network manager's approval) access to broadcast and can request and be dynamically assigned additional feeds. For example—in some embodiments, the Common Operating Picture can be put on broadcast to all Broadcast users, but a Demand user can then request and be assigned a video feed from the organic sensor—or even receive feeds from offboard sensors that are provided to the presently disclosed wireless mesh network.

Synthetic Demand User—a Synthetic Demand User has all levels of access described above with reference to other users but can also take primary control of any box on the aircraft. For example—members of a Marine Platoon on board an aircraft can be connected via Wireless as limited Synthetic Demand users—communicating amongst themselves (or independently via their own wireless mesh network-style system) without interfacing with anything on the aircraft. This adaptable connection could also via the same connection receive information as a Broadcast user, allowing them to see the Common Operating Picture (COP) on their tablets and coordinating therewith. At some time during the flight, as the situation on the ground changes, a Platoon Commander might have a need to discuss changes in the approach, Landing Zone, or Mission Objectives with other Platoon Leaders in other aircraft as is dynamically managed by the AI based network manager. That Platoon Leader has the ability to take control of a radio channel and communicate directly with their Platoon Leaders in other aircraft, by whatever circuit is provided to them. The Platoon leader can then direct radio communications, or even possibly control comms external to the present wireless network (for example, UWB/WB networks at higher powers with distance ranges in 1000's of Meters or in the single digit KM's)

System Manager—in some embodiments, the System Manager is an AI-based network manager. This user comprises everything from user definitions, adaptive changes, AI style/"learning" environments where assets, computing power, edge allocation, etc., can be dynamically managed, assigned and organized. This manager however does not need to reside in a single or specific box. All VB connections distributed throughout the aircraft and on every communications port has blockchain level security, an ability to dynamically reassign EDGE computing assets, and an AI support to maximize system throughput, react to security breaches, system degradation, connectivity issues and other challenges, including but not limited to, growth potential. Through the use of blockchain "smart contracts" (system security functions) including user management scripts, low level short maintenance routines, etc., can exist to perform self-healing functions in a distributed manner. As computing power increases in the future, VB boxes can be replaced on a maintenance level approach. Thus procurement, upgrades and expansions are performed on an attrition and as-needed basis. When a new VB box/node enters the system, it is blockchain registered as described above, thus eliminating the need for having system/component specific logistics management. In this sense, the blockchain-secured wireless mesh network using pulse-based PBC (WB or UWB) communication methods and apparatus is obsolescence free.

The capability of leveraging Ultra-Wide Band/Wide Band (or PBC) communications allows for an extremely adaptable approach to aircraft communications protocol. If the blockchain secured wireless network using PBC (WB or UWB) communication methods and apparatus system is adopted from early system design, the need for additional aircraft wiring only exists as a failsafe approach, if it is needed at all. If adopted post-production, the disclosed protocol can be instituted and deployed piecemeal. This can, in some embodiments, be deployed initially as a gateway and gradually as systems are upgraded to the point that over time it will take over the system. This allows for maintenance that gradually removes faulty wiring and improves connectivity as it is extremely adaptable and flexible. Such a user-defined, robust, combat survivable and adaptable avionics approach provides the computing power, network capability and cyber safe avionics environment for the next several decades.

As described above, in one exemplary embodiment, the users of the presently disclosed blockchain secured wireless mesh network using pulse-based (PBC) wideband or ultra-wideband communication methods and apparatus fall into the following roles:

Receiver Only—able to get voice/data/video as designated at provisioning; Receiver/Transmitter—receives voice/data/video as designated at provisioning, can source voice/data/video to the network; Broadcaster—Transmitter only—source for voice/data/video as updated; and Super User—can control other nodes, transmit/receive at will.

As is well known, BitTorrent (abbreviated to BT) is a communication protocol for peer-to-peer file sharing (P2P), which enables users to distribute data and electronic files over the Internet in a decentralized manner. BitTorrent is one of the most common protocols for transferring large files; such as, digital video files containing television shows, video clips, movies, etc. and/or digital audio files containing songs. In the BitTorrent Live workflow, the broadcaster creates a video feed from its studio, encodes it into a real-time messaging protocol (RTMP) stream, and sends it to the BitTorrent (BT) ingest server. The BT ingest server then distributes the stream to the first 10 peers. From the 11th viewer (peer) on, the live signal comes from other viewers, not BitTorrent. When a P2P client has multiple possible sources to draw from, it chooses the most robust one. If a stream starts to degrade, the client automatically pulls the stream from a better source.

Such a workflow may sound horribly nonsecure to broadcasters that are concerned about misuse or piracy. All of the P2P connections could be hard to protect against piracy. However, this is not the case. However, this means for distributing video is actually more secure than how video is distributed now. First, all the video transmissions are encrypted. Second, there is no single point of failure because the video distribution is broken up. There is no one place to get all of the video. There is no single peer uploading the entire video information. In many ways, this means for distributing video information is more secure than traditional cable video distribution. The platform encrypts video with a pseudo-random stream cipher, and only authorized users are given the decryption key.

Ultra-Wide-Band and PCB communications provide a break-through innovation for use with wireless mesh networking and wireless mesh networks. PCB digitally samples and encodes information just the same way as a digital radio performs today. The difference is that instead of using longer pulses, the UWB pulses are EXTREMELY short, approximating a nanosecond. The pulses are extremely sharp. They have very sharp rise and fall times. The pulses can be shaped such that they do not form square pulses. They can approximate a bar chart, in one example. Also, using Pulse Code Modulation (PCM) techniques, the time in between pulses can be varied to create different desired channel structures. Also, less power is required as compared with prior art approaches and techniques. When extremely short pulses are used, the bandwidth increases in width. When less power is used, the range of a transmitted signal decreases.

Conclusion

A number of advantages are offered by the present Blockchain Secured Polyphonic Radio (PR) wireless mesh network using pulse-based communications (PBC) methods and apparatus. In some embodiments, a PR wireless mesh network combines security, encryption and other benefits provided by PBC networks, together with Blockchain authentication and encryption techniques, an established Named Data Network (NDN), and implements the resulting inventive network architecture and design using software defined radio (SDR) platforms as network nodes.

In one exemplary embodiment, a security Blockchain is developed upon network setup and upon initial network provisioning. Polyphonic Radios are registered or provisioned by a Network Administrator with a plurality of Blockchain numbers upon initial network provisioning. Once joined in the mesh network, the various PRs use PBC communications to communicate with each other in the network. The SDR platforms allow computationally extensive signal processing algorithms to be implemented in software. The SDR platforms also offer a great deal of flexibility in RF communications parameters and helps the Polyphonic Radio network to dynamically adapt itself to its intended operational environment for optimal performance.

In some embodiments, the PR PBC wireless mesh network advantageously uses a Named Data Network (NDN) protocols approach when communicating data in the network. In accordance with this approach, regardless of the source of the data, information is provided to a selected PR and received from the selected PR based upon an NDN network security profile assigned to the selected PR when it joins the network.

Some exemplary applications or use cases for the inventive PR wireless mesh network are described. For example, in some embodiments, the PRs may be used as small unit tactical radios. In other embodiments, the PR wireless mesh network is used to implement "swarm" operations.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A polyphonic radio (PR) wireless mesh network, comprising:
    (a) a plurality of Polyphonic Radios (PRs) in communication with each other using RF pulse-based communications (PBC); wherein the PBC communications include Ultra-Wide Band (UWB) and Wideband (WB) Communication technologies, and wherein the PBC communications permit transmission of voice, data and video over relatively short-range distances; and wherein each PR has an NDN network security profile assigned thereto;
    (b) a Network Administrator controlling communications on the mesh network, wherein the Network Administrator uses Blockchain authentication and encryption techniques to determine and control the authenticity of a PR on the mesh network, and wherein the Network Administrator determines whether a selected PR is permitted use and communication in the mesh network using the Blockchain techniques; and
    (c) Named Data Network (NDN) communication protocols adapted for use with the wireless mesh network, wherein data is distributed among the PRs based on the NDN network security profile assigned to each PR wherein the NDN network security profile determines the type of data each PR is allowed to transmit and receive within the mesh network;

wherein the PRs are used to implement swarm operations requiring the coordination of a plurality of vehicles or users to achieve an operational objective, and wherein the plurality of vehicles each have a PR that communicates positional and other information to a swarm operation coordinator, and wherein the operation, motion and pilotage of each of the vehicles is controlled and coordinated to achieve the operational objective.

2. The PR wireless mesh network of claim 1, wherein the swarm operation comprises delivery of packages using unmanned drones, and wherein each unmanned drone is equipped with one or more PRs, and wherein the traffic routes, flight paths, arrival, departure, altitude, airspeed, heading, GPS positions, and position accuracy of each unmanned drone are tracked and controlled to effect the swarm operational objective.

3. The PR wireless mesh network of claim 1, wherein the swarm operation comprises coordinating a plurality of autopiloted automobiles to improve traffic flow, and wherein each autopiloted automobile has one or more PRs, and wherein each PR transmits information that may include common information comprising the following: the speed of each automobile; brake usage of each automobile; alerts from one or more PRs in the network that may provide information related to automobile accidents; and information from popular applications across the plurality of automobiles.

* * * * *